United States Patent
Wang et al.

(10) Patent No.: US 12,197,085 B2
(45) Date of Patent: *Jan. 14, 2025

(54) LIQUID CRYSTAL DISPLAY PANEL AND METHOD OF MANUFACTURING THE SAME, AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Feifei Wang, Beijing (CN); Hongming Zhan, Beijing (CN); Xibin Shao, Beijing (CN); Lintao Ji, Beijing (CN); Bowen Li, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,208

(22) Filed: May 31, 2023

(65) Prior Publication Data

US 2023/0305340 A1      Sep. 28, 2023

Related U.S. Application Data

(63) Continuation of application No. 17/288,364, filed as application No. PCT/CN2021/070299 on Jan. 5, 2021, now Pat. No. 11,703,719.

(30) Foreign Application Priority Data

Jan. 10, 2020 (CN) .......................... 202020053145.9
Apr. 9, 2020 (CN) .......................... 202010276034.9

(51) Int. Cl.
G02F 1/1337 (2006.01)
G02F 1/1333 (2006.01)
G02F 1/13363 (2006.01)

(52) U.S. Cl.
CPC .. G02F 1/133749 (2021.01); G02F 1/133357 (2021.01); G02F 1/13363 (2013.01)

(58) Field of Classification Search
CPC ............. G02F 1/133749; G02F 1/1337; G02F 1/13363
See application file for complete search history.

(56) References Cited

U.S. PATENT DOCUMENTS 11,703,719 B2 *  7/2023  Wang ................ G02F 1/133707
                                              349/117
2008/0030655 A1  2/2008  Sugiyama et al.
(Continued)

FOREIGN PATENT DOCUMENTS

CN       105911771 A  *  8/2016  ........... G02F 1/1333
CN       108761925 A  *  11/2018 ......... G02F 1/13363
(Continued)

OTHER PUBLICATIONS

Advisory Action received in corresponding U.S. Appl. No. 17/288,364, dated Oct. 18, 2022, 4 pages.
(Continued)

Primary Examiner — Jia X Pan
(74) Attorney, Agent, or Firm — Dority & Manning, P.A.

(57) ABSTRACT

A liquid crystal display panel includes a first and second base substrates, a liquid crystal layer and an optical compensation layer. In the liquid crystal layer, a first alignment film is configured to anchor a part, proximate to the first alignment film, of second liquid crystal molecules, and a second alignment film is configured to anchor a part, proximate to the second alignment film, of the second liquid
(Continued)

crystal molecules. In the optical compensation layer, a third alignment film is configured to anchor first liquid crystal molecules proximate to the third alignment film. A direction of orthogonal projections of long axes of the first liquid crystal molecules is parallel to a direction of orthogonal projections of long axes of second liquid crystal molecules anchored by the first and second alignment films. Rubbing directions of the first alignment film, the second alignment film and the third alignment film are the same.

16 Claims, 12 Drawing Sheets

(56) References Cited

U.S. PATENT DOCUMENTS

| | | | |
|---|---|---|---|
| 2013/0229588 A1* | 9/2013 | Nishida | G02F 1/134363 349/33 |
| 2014/0293198 A1 | 10/2014 | Iwasaki et al. | |
| 2016/0342002 A1 | 11/2016 | Qin | |
| 2019/0196236 A1 | 6/2019 | Chen et al. | |
| 2020/0183212 A1 | 6/2020 | Jia et al. | |
| 2020/0371399 A1 | 11/2020 | Liu et al. | |
| 2023/0078699 A1* | 3/2023 | Ji | G02F 1/13363 349/99 |
| 2023/0221599 A1* | 7/2023 | Li | G02F 1/133634 349/56 |

FOREIGN PATENT DOCUMENTS

| | | |
|---|---|---|
| CN | 211014954 U | 7/2020 |
| CN | 211979379 U | 11/2020 |
| KR | 101441075 B1 | 9/2014 |
| WO | WO 2019/223739 A1 | 11/2019 |

OTHER PUBLICATIONS

Final Office Action received in corresponding U.S. Appl. No. 17/288,364, dated Aug. 3, 2022, 20 pages.

International Search Report and Written Opinion (with English translation) for PCT Application No. PCT/CN2021/070299, dated Mar. 29, 2021, 27 pages.

Non-Final Office Action received in corresponding U.S. Appl. No. 17/288,364, dated Mar. 15, 2022, 29 pages.

Non-Final Office Action received in corresponding U.S. Appl. No. 17/288,364, dated Nov. 23, 2022, 9 pages.

Notice of Allowance received in corresponding U.S. Appl. No. 17/288,364, dated Mar. 1, 2023, 10 pages.

Office Action (with English translation) received in corresponding CN Application No. 202180008730.4, dated Jan. 18, 2023, 18 pages.

* cited by examiner

LIQUID CRYSTAL DISPLAY PANEL AND METHOD OF MANUFACTURING THE SAME, AND DISPLAY DEVICE

CROSS-REFERENCE TO RELATED APPLICATIONS

This application is a continuation of U.S. Ser. No. 17/288,364, filed on Apr. 23, 2021, which claims priority to International Patent Application No. PCT/CN2021/070299, filed on Jan. 5, 2021, which in turn claims priority to Chinese patent application No. 202020053145.9, filed on Jan. 10, 2020, and Chinese patent application No. 202010276034.9, filed on Apr. 9, 2020, which are incorporated herein by reference in their entirety.

TECHNICAL FIELD

The present disclosure relates to the field of display technologies, and in particular, to a liquid crystal display panel and a method of manufacturing the same, and a display device.

BACKGROUND

Liquid crystal displays (LCDs) have small volume, low power consumption and no radiation, and occupy a dominant position in the current display market. A liquid crystal display panel mainly includes a color filter (CF) substrate, an array substrate, and a liquid crystal layer disposed between the color filter substrate and the array substrate.

SUMMARY

In one aspect, a liquid crystal display panel is provided. The display panel includes a first base substrate and a second base substrate that are arranged opposite to each other, a liquid crystal layer and an optical compensation layer. The liquid crystal layer is disposed between the first base substrate and the second base substrate. The liquid crystal layer includes a first alignment film and a second alignment film that are arranged opposite to each other, and a second liquid crystal molecular layer located between the first alignment film and the second alignment film. The first alignment film is configured to anchor a part, proximate to the first alignment film, of second liquid crystal molecules in the second liquid crystal molecular layer. The second alignment film is configured to anchor a part, proximate to the second alignment film, of the second liquid crystal molecules in the second liquid crystal molecular layer. The optical compensation layer is disposed on a side of the first alignment film or the second alignment film away from the second liquid crystal molecular layer, and the optical compensation layer includes a third alignment film and a first liquid crystal molecular layer. The third alignment film is configured to anchor first liquid crystal molecules, proximate to the third alignment film, in the first liquid crystal molecular layer. An extending direction of orthogonal projections of long axes of the first liquid crystal molecules on a plane where the third alignment film is located is parallel to an extending direction of orthogonal projections of long axes of second liquid crystal molecules anchored by the first alignment film and the second alignment film on the plane where the third alignment film is located. Rubbing directions of the first alignment film, the second alignment film and the third alignment film are the same.

In some embodiments, the part of second liquid crystal molecules proximate to the first alignment film have a first pretilt angle; the part of second liquid crystal molecules proximate to the second alignment film have a second pretilt angle; a direction of the first pretilt angle is opposite to a direction of the second pretilt angle; and the first liquid crystal molecules proximate to the third alignment film have a third pretilt angle.

In some embodiments, a direction of the third pretilt angle is the same as the direction of the first pretilt angle or the direction of the second pretilt angle.

In some embodiments, a sum of an in-plane retardation of the optical compensation layer and an in-plane retardation of the liquid crystal layer is equal to a positive integer multiple of a first wavelength. The first wavelength is in a range of 535 nm±50 nm.

In some embodiments, the in-plane retardation of the optical compensation layer is in a range of 185 nm±25 nm, and the in-plane retardation of the liquid crystal layer is in a range of 350 nm±25 nm.

In some embodiments, the in-plane retardation of the optical compensation layer is in a range of 160 nm to 240 nm, and the in-plane retardation of the liquid crystal layer is in a range of 350 nm±25 nm.

In some embodiments, the third alignment film is disposed on a side of the first base substrate proximate to the liquid crystal layer.

Or in some embodiments, the third alignment film is disposed on a side of the first base substrate away from the liquid crystal layer.

Or in some embodiments, the third alignment film is disposed on a side of the second base substrate proximate to the liquid crystal layer.

Or in some embodiments, the third alignment film is disposed on a side of the second base substrate away from the liquid crystal layer.

In some embodiments, the optical compensation layer further includes a third base substrate, and the third base substrate and the third alignment film are located on a same side or opposite sides of the first liquid crystal molecular layer.

In some embodiments, the third alignment film and the second alignment film are disposed on opposite sides of the third base substrate.

In some embodiments, the optical compensation layer further includes a fourth alignment film disposed on a side of the third base substrate away from the liquid crystal layer or on a side of the second base substrate proximate to the liquid crystal layer. The fourth alignment film is configured to anchor a part, proximate to the fourth alignment film, of first liquid crystal molecules in the first liquid crystal molecular layer; the first liquid crystal molecules proximate to the third alignment film have a third pretilt angle; the part of first liquid crystal molecules proximate to the fourth alignment film have a fourth pretilt angle; and a direction of the fourth pretilt angle is opposite to or the same as a direction of the third pretilt angle.

In some embodiments, the fourth alignment film and the second alignment film are disposed on opposite sides of the third base substrate.

In some embodiments, the liquid crystal display panel further includes a planarization layer. The third alignment film is disposed on a side of the second base substrate proximate to the liquid crystal layer, the planarization layer is disposed on a side of the first liquid crystal molecular layer proximate to the liquid crystal layer, and the second alignment film is disposed on a side of the planarization layer proximate to the liquid crystal layer.

In some embodiments, an alignment direction of the first alignment film is the same as an alignment direction of the second alignment film.

In some embodiments, the optical compensation layer is a +A compensation layer.

In some embodiments, the first pretilt angle, the second pretilt angle and the third pretilt angle are equal in magnitude.

In some embodiments, the first pretilt angle, the second pretilt angle and the third pretilt angle are in a range of 2°±2°.

In some embodiments, the first pretilt angle, the second pretilt angle and the third pretilt angle are in a range of 2°±1°.

In some embodiments, the liquid crystal display panel further includes a functional film layer. The functional film layer is disposed on the first base substrate. The functional film layer and the optical compensation layer are disposed on opposite sides of the liquid crystal layer, or the functional film layer and the liquid crystal layer are disposed on opposite sides of the optical compensation layer.

In some embodiments, the second liquid crystal molecules are negative liquid crystal molecules.

In another aspect, a display device is provided. The display device includes the liquid crystal display panel as described in any of the above embodiments.

In yet another aspect, a method of manufacturing a liquid crystal display panel is provided, and the method includes:
forming a first alignment film on a side of a first base substrate:
  forming a third alignment film on a side of a second base substrate;
  forming and curing a first liquid crystal molecular layer on the third alignment film, so that the third alignment film anchors first liquid crystal molecules, proximate to the third alignment film, in the first liquid crystal molecular layer,
  forming a second alignment film on the first liquid crystal molecular layer; and
  assembling the first base substrate on which the first alignment film has been formed and the second base substrate on which the second alignment film has been formed to form a cell, and forming a second liquid crystal molecular layer between the first alignment film and the second alignment film. The first alignment film anchors a part, proximate to the first alignment film, of second liquid crystal molecules in the second liquid crystal molecular layer, and the second alignment film anchors a part, proximate to the second alignment film, of the second liquid crystal molecules in the second liquid crystal molecular layer. An extending direction of orthogonal projections of long axes of second liquid crystal molecules anchored by the first alignment film and the second alignment film on a plane where the third alignment film is located is parallel to an extending direction of orthogonal projections of long axes of first liquid crystal molecules anchored by the third alignment film on the plane where the third alignment film is located. The first alignment film, the second alignment film and the third alignment film are formed through an alignment rubbing process, and rubbing directions of the first alignment film, the second alignment film and the third alignment film are the same.

In some embodiments, before the second alignment film is formed on the first liquid crystal molecular layer, the method further includes forming a planarization layer on the first liquid crystal molecular layer.

BRIEF DESCRIPTION OF THE DRAWINGS

In order to describe technical solutions in the present disclosure more clearly, accompanying drawings to be used in the description of some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure relate.

DETAILED DESCRIPTION

Figure 1A:
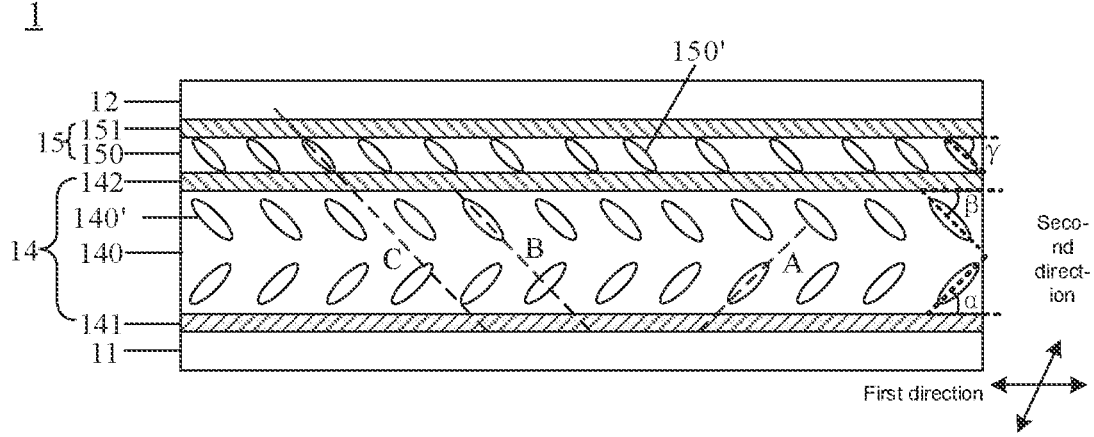
FIG. 1A is a schematic diagram showing a structure of a liquid crystal display panel, in accordance with embodiments of the present disclosure.

Technical solutions in some embodiments of the present disclosure will be described clearly and completely below with reference to the accompanying drawings.

Obviously, the described embodiments are merely some but not all embodiments of the present disclosure. All other embodiments obtained by a person of ordinary skill in the art on the basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are used for descriptive purposes only and are not to be construed as indicating or implying the relative importance or implicitly indicating the number of indicated technical features. Thus, features defined with "first", "second" may explicitly or implicitly include one or more of the features. In the description of the embodiments of the present disclosure, term "a plurality of/the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined" or "in response to determining" or "in a case where [the stated condition or event] is detected" or "in response to detecting [the stated condition or event]", depending on the context.

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values other than those stated.

As used herein, the terms such as "same", "opposite", "equal", "parallel" and "perpendicular" include a stated value and an average value within an acceptable range of deviation of a particular value. The acceptable range of deviation is determined by a person of ordinary skill in the art in view of measurement in question and errors associated with measurement of a particular quantity (i.e., limitations of a measurement system). For example, the term "same" includes absolutely same and approximately same, where a range of approximately same is within an acceptable range of deviation.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed as being limited to the shapes of regions shown herein, but include deviations in the shapes due to, for example, manufacturing. For example, an etching region shown as a rectangle generally has a curved feature. Thus, the regions shown in the accompanying drawings are schematic in nature, and their shapes are not intended to show actual shapes of the regions in a device, and are not intended to limit the scope of the exemplary embodiments.

Embodiments of the present disclosure provides a display device, e.g., a display device using an advanced super dimension switch (ADS) mode.

For example, the display device may be any device that displays images whether in motion (e.g., video) or stationary (e.g., still images) and regardless of literal or graphical. The display device may be one of a variety of display devices including, but not limit to, mobile phones, wireless devices, personal digital assistants (PDAs), hand-held or portable computers, global positioning system (GPS) receivers/navigators, cameras, moving picture experts group 4 (MP4) video players, video cameras, game consoles, flat panel displays, computer monitors and automobile displays (e.g., automobile tachographs or reverse images), etc.

For example, the display device includes a liquid crystal display panel and a backlight module, and the backlight module is used for providing the liquid crystal display panel with light for display.

Referring to FIGS. 1A to 1I, the liquid crystal display panel 1 includes a first base substrate 11 and a second base substrate 12 that are arranged opposite to each other. Materials of the first base substrate 11 and the second base substrate 12 may be the same, for example, are both glass, and may, of course, also be different, which is not limited in the present disclosure.

A liquid crystal layer 14 is provided between the first base substrate 11 and the second base substrate 12. The liquid crystal layer 14 includes a first alignment film 141 and a second alignment film 142 that are arranged opposite to each other, and a second liquid crystal molecular layer 140 located between the first alignment film 141 and the second alignment film 142. The first alignment film 141 is configured to anchor a part, proximate to the first alignment film 141, of second liquid crystal molecules 140' in the second liquid crystal molecular layer 140, so that the part of second liquid crystal molecules 140' proximate to the first alignment film 141 have a first pretilt angle α. The second alignment film 142 is configured to anchor a part, proximate to the second alignment film 142, of the second liquid crystal molecules 140' in the second liquid crystal molecular layer 140, so that the part of second liquid crystal molecules 140' proximate to the second alignment film 142 have a second pretilt angle β. A direction of the first pretilt angle α is opposite to a direction of the second pretilt angle β.

Referring to FIGS. 1A to 1G, for example, the part of second liquid crystal molecules 140' proximate to the first alignment film 141 are a layer of second liquid crystal molecules 140' closest to the first alignment film 141, and the part of second liquid crystal molecules 140' proximate to the second alignment film 142 are a layer of second liquid crystal molecules 140' closest to the second alignment film 142.

As an illustration, FIGS. 1A to 1G only show the layer of second liquid crystal molecules 140' closest to the first alignment film 141 and the layer of second liquid crystal molecules 140' closest to the second alignment film 142 in the second liquid crystal molecular layer 140.

An optical compensation layer 15 is provided on a side of the first alignment film 141 or the second alignment film 142 away from the second liquid crystal molecular layer 140, and the optical compensation layer 15 includes a third alignment film 151 and a first liquid crystal molecular layer 150. The third alignment film 151 is configured to anchor first liquid crystal molecules 150', proximate to the third alignment film, in the first liquid crystal molecular layer 150, so that the first liquid crystal molecules 150' proximate to the third alignment film 151 have a third pretilt angle γ. An extending direction of orthogonal projections of long axes of the first liquid crystal molecules 150' on a plane where the third alignment film 151 is located is parallel or perpendicular to an extending direction of orthogonal projections of long axes of second liquid crystal molecules 140' anchored by the first alignment film 141 and the second alignment film 142 on the plane where the third alignment film 151 is located.

Referring to FIGS. 1A to 1G, for example, the first liquid crystal molecules 150' proximate to the third alignment film 151 are a layer of first liquid crystal molecules 150' closest to the third alignment film 151.

As an illustration, FIGS. 1A to 1I only show the layer of first liquid crystal molecules 150', closest to the third alignment film 151, in the first liquid crystal molecular layer 150.

It will be noted that the state of the liquid crystal display panel 1 shown in FIGS. 1A to 1I is a state of the liquid crystal display panel 1 when no voltage is applied thereto.

For liquid crystal molecules, they may be classified into rod-like liquid crystal molecules and discotic liquid crystal molecules according to their shape. As for the rod-like liquid crystal molecule, a direction of a long axis thereof is a direction of an optical axis, whereas as for the discotic liquid crystal molecule, a direction of a short axis thereof is a direction of an optical axis. In some embodiments, first liquid crystal molecules 150' in the first liquid crystal molecular layer 150 are rod-like liquid crystal molecules. In some embodiments, the second liquid crystal molecules 140' in the second liquid crystal molecular layer 140 are rod-like liquid crystal molecules.

In some embodiments, the second liquid crystal molecules 140' may be positive liquid crystal molecules or negative liquid crystal molecules. Since the use of negative liquid crystal molecules as the second liquid crystal molecules 140' may make a light transmittance of the display panel higher in an L255 state, the liquid crystal display panel 1 adopting the negative liquid crystal molecules has a higher contrast ratio and a better display effect.

An alignment film may make at least a part of liquid crystal molecules in a pre-tilted state, so that included angles are formed between long axes of the at least a part of liquid crystal molecules and a plane where the alignment film is located. In some embodiments of the present disclosure, a pretilt angle refers to an acute angle formed between the long axis of the rod-like liquid crystal molecule and an alignment direction of the alignment film, and a straight line where the long axis of the rod-like liquid crystal molecule with the pretilt angle is located is intersected with the plane where the alignment film is located.

The pretilt angle presented by the second liquid crystal molecule 140' is an acute angle between the long axis of the second liquid crystal molecule 140' and an alignment direction of the first alignment film 141 (or an alignment direction of the second alignment film 142) when the liquid crystal display panel 1 is not powered on or a voltage difference between a pixel electrode and a common electrode is 0.

The pretilt angle presented by the first liquid crystal molecule 150' is an acute angle between the long axis of the first liquid crystal molecule 150' and an alignment direction of the third alignment film 151 when the liquid crystal display panel 1 is not powered on or the voltage difference between the pixel electrode and the common electrode is 0.

For example, the alignment direction of the first alignment film 141 is the same as the alignment direction of the second alignment film 142. For example, referring to FIGS. 1A to 1I, the alignment direction of the first alignment film 141 and the alignment direction of the second alignment film 142 are both a first direction, e.g., an X-axis (in a three-dimensional coordinate system) direction, which is schematically a left-right direction of a paper surface in FIGS. 1A to 1I.

For example, the alignment direction of the third alignment film 151 is the same as alignment directions of the first alignment film 141 and the second alignment film 142. For example, referring to FIGS. 1A to 1G, alignment directions of the first alignment film 141, the second alignment direction 142 and the third alignment direction 151 are all the first direction.

For another example, the alignment direction of the third alignment film 151 is perpendicular to the alignment directions of the first alignment film 141 and the second alignment film 142. For example, referring to FIGS. 1H and 1I, the alignment directions of the first alignment film 141 and the second alignment film 142 are the first direction, and the alignment direction of the third alignment film 151 is a second direction perpendicular to the first direction, e.g., a Y-axis (in the three-dimensional coordinate system) direction, which is schematically an inside-outside direction perpendicular to the paper surface in FIGS. 1H and 1I.

In a case where the alignment direction of the third alignment film 151 is the same as the alignment directions of the first alignment film 141 and the second alignment film 142, if the tilt angle is not taken into consideration, the first liquid crystal molecules 150' are parallel to the second liquid crystal molecules 140' anchored by the first alignment film 141 and the second alignment film 142. If the tilt angle is taken into consideration, the second liquid crystal molecules 140' anchored by the first alignment film 141 have the first pretilt angle α, the second liquid crystal molecules 140' anchored by the second alignment film 142 have the second pretilt angle β, and the first liquid crystal molecules 150' anchored by the third alignment film 151 have the third pretilt angle γ. The first pretilt angle α is an acute angle between a straight line where the long axis of the second liquid crystal molecule 140' anchored by the first alignment film 141 is located and the first direction, the second pretilt angle β is an acute angle between a straight line where the long axis of the second liquid crystal molecule 140' anchored by the second alignment film 142 is located and the first direction, and the third pretilt angle γ is an acute angle between a long axis direction of the first liquid crystal molecule 150' anchored by the third alignment film 151 and the second direction. Orthogonal projections of straight lines (for example, the dotted line indicated by C in FIGS. 1A and 1B) where the long axes of the first liquid crystal molecules 150' are located on the plane where the third alignment film 151 is located are parallel to orthogonal projections of straight lines (for example, the dotted lines indicated by A and B in FIGS. 1A and 1B) where the long axes of the second liquid crystal molecules 140' anchored by the first alignment film 141 and the second alignment film 142 are located on the plane where the third alignment film 151 is located.

Figure 1H:
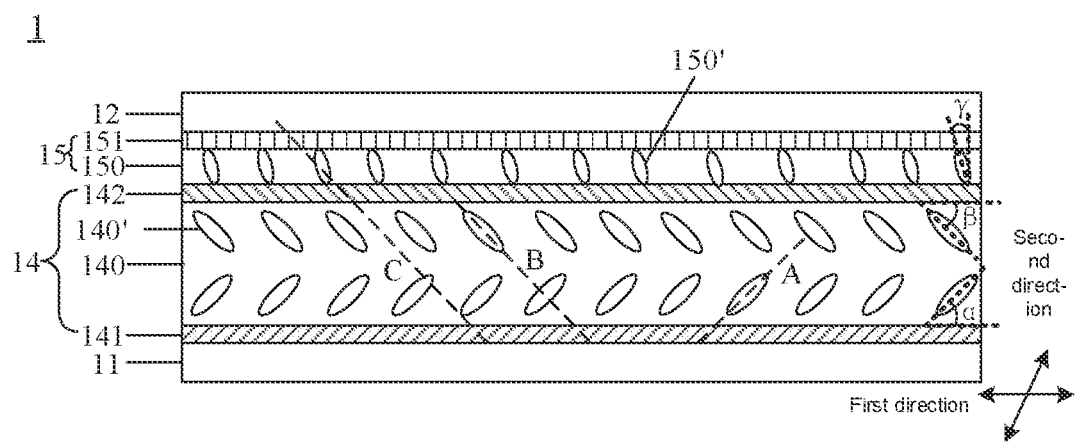
Figure 2A:
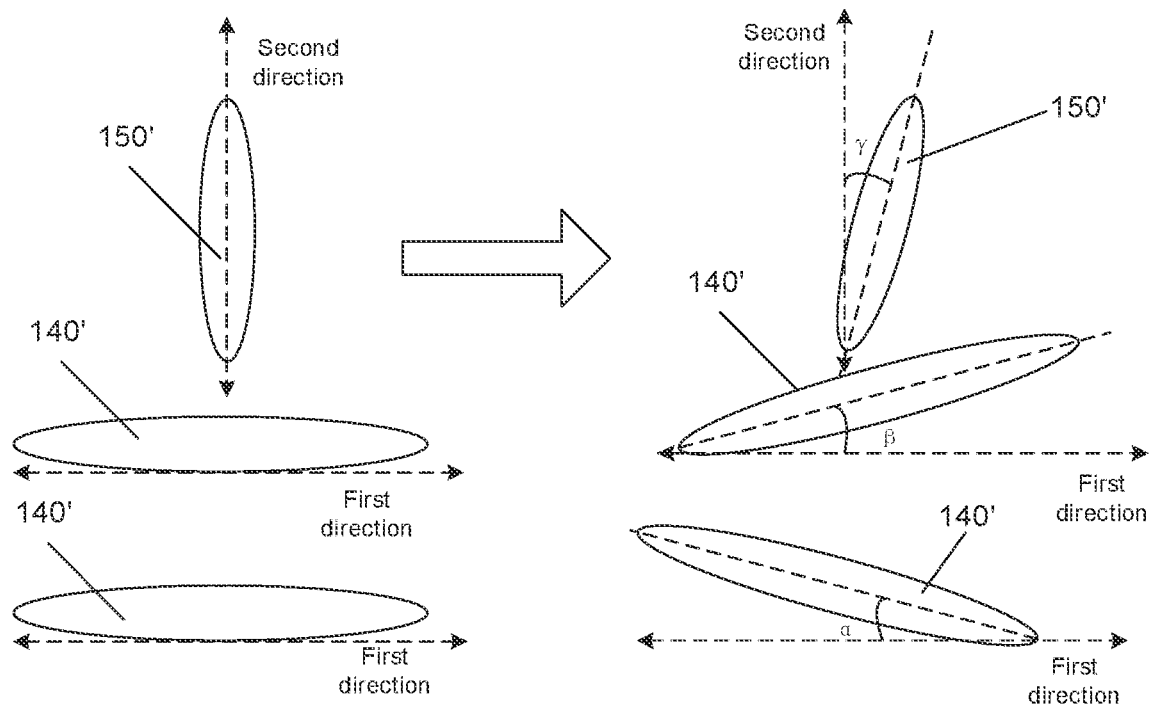
FIG. 2A is a perspective view showing a distribution state of first liquid crystal molecules and second liquid crystal molecules, in accordance with the embodiments of the present disclosure.

In a case where the alignment direction of the third alignment film 151 is perpendicular to the alignment directions of the first alignment film 141 and the second alignment film 142, for example, referring to FIG. 2A, if the tilt angle is not taken into consideration, the first liquid crystal molecules 150' are perpendicular to the second liquid crystal molecules 140' anchored by the first alignment film 141 and the second alignment film 142, and the second liquid crystal molecules 140' anchored by the first alignment film 141 are parallel to the second liquid crystal molecules 140' anchored by the second alignment film 142. If the tilt angle is taken into consideration, the second liquid crystal molecules 140' anchored by the first alignment film 141 have the first pretilt angle α, the second liquid crystal molecules 140' anchored by the second alignment film 142 have the second pretilt angle β, and the first liquid crystal molecules 150' anchored by the third alignment film 151 have the third pretilt angle γ. The first pretilt angle α is the acute angle between the straight line where the long axis of the second liquid crystal molecule 140' anchored by the first alignment film 141 is located and the first direction, the second pretilt angle β is the acute angle between the straight line where the long axis of the second liquid crystal molecule 140' anchored by the second alignment film 142 is located and the first direction, and the third pretilt angle γ is the acute angle between the long axis direction of the first liquid crystal molecule 150' anchored by the third alignment film 151 and the second direction. The orthogonal projections of the straight lines (for example, the dotted line indicated by C in FIG. 1H) where the long axes of the first liquid crystal molecules 150' are located on the plane where the third alignment film 151 is located are perpendicular to the orthogonal projections of the straight lines (for example, the dotted lines indicated by A and B in FIG. 1H) where the long axes of the second liquid crystal molecules 140' anchored by the first alignment film 141 and the second alignment film 142 are located on the plane where the third alignment film 151 is located.

The alignment films are made of a polymer material, e.g., polyimide (PI). Alignment directions of the alignment films (including the first alignment film 141, the second alignment film 142 and the third alignment film 151) include the first direction, or the first direction and the second direction. Pretilt angles are included angles formed between long axis directions of liquid crystal molecules (including the first liquid crystal molecules 150' and the second liquid crystal molecules 140') and an alignment direction of a corresponding alignment film through a further production process of the alignment film on a basis of determining the alignment direction of the alignment film.

Figure 2B:
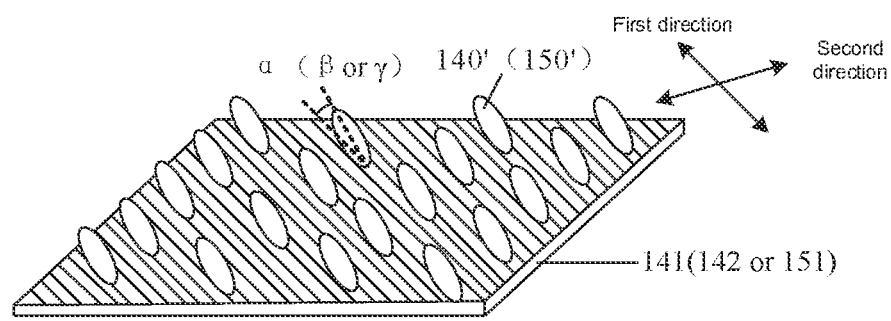
FIG. 2B is a structural diagram of a first alignment film, a second alignment film and a third alignment film, in accordance with the embodiments of the present disclosure.

For example, referring to FIG. 2B, in a case where the alignment directions of the first alignment film 141, the second alignment film 142 and the third alignment film 151 are all the first direction, an acute angle between a long axis direction of the second liquid crystal molecule 140' anchored by the first alignment film 141 and the first direction is the first pretilt angle α, an acute angle between a long axis direction of the second liquid crystal molecule 140' anchored by the second alignment film 142 and the first direction is the second pretilt angle β, and an acute angle between the long axis direction of the first liquid crystal molecule 150' and the first direction is the third pretilt angle γ.

Figure 2C:
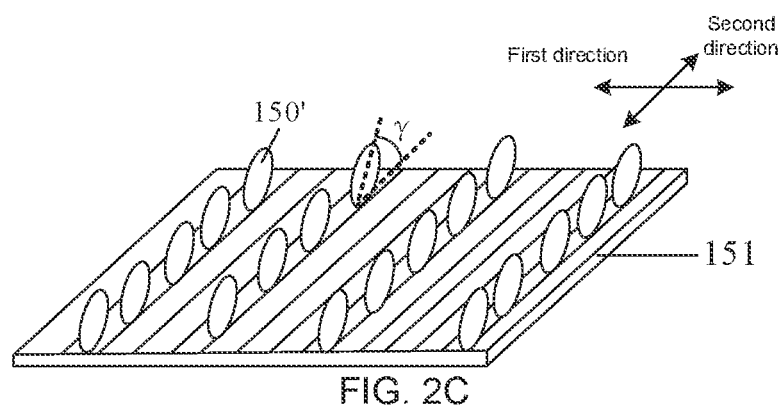
FIG. 2C is a structural diagram of another third alignment film, in accordance with the embodiments of the present disclosure.

For another example, referring to FIG. 2C, in a case where the alignment direction of the third alignment film 151 is the second direction, an acute angle between the long axis direction of the first liquid crystal molecule 150' and the second direction is the third pretilt angle γ.

The first alignment film 141, the second alignment film 142 and the third alignment film 151 may all be formed, for example, through a rubbing alignment process. Rubbing directions of the first alignment film 141, the second alignment film 142 and the third alignment film 151 include information about the alignment directions and the pretilt angles of the first alignment film 141, the second alignment film 142 and the third alignment film 151. That is, the rubbing direction determine the alignment direction, and both the magnitude and direction of the pretilt angle.

Figure 2D:
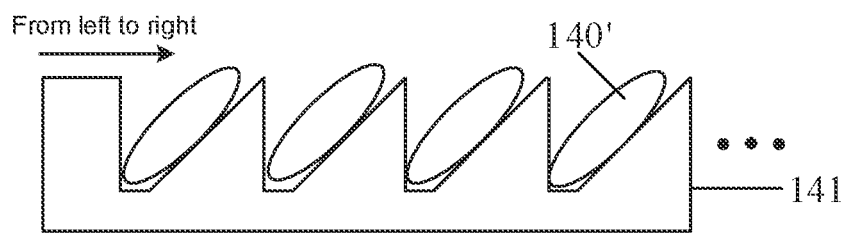
FIG. 2D is a sectional view of a first alignment film, in accordance with the embodiments of the present disclosure.
Figure 2E:
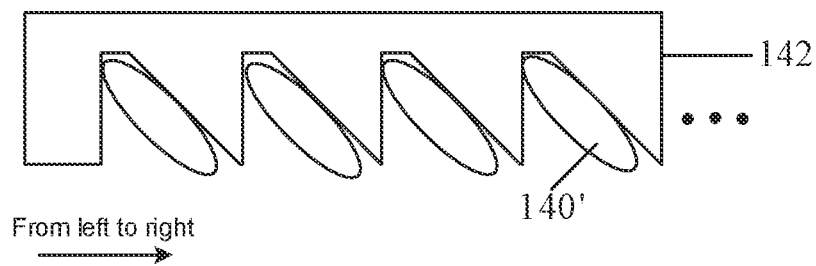
FIG. 2E is a sectional view of a second alignment film, in accordance with the embodiments of the present disclosure.
Figure 2F:
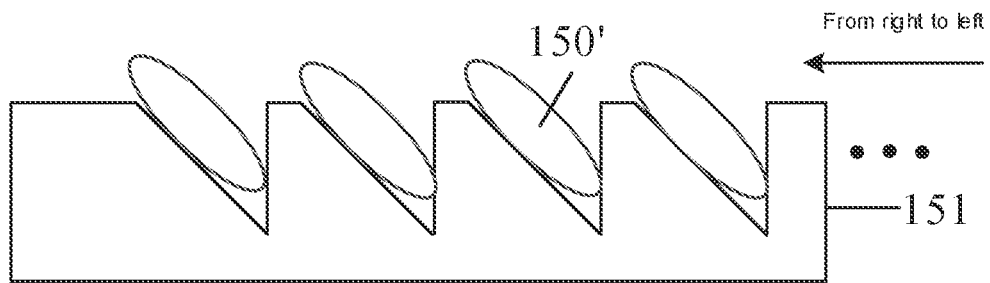
FIG. 2F is a sectional view of a third alignment film, in accordance with the embodiments of the present disclosure.

For example, referring to FIGS. 2D and 2E, oblique upward angles are formed on an upper surface (i.e., a surface proximate to the second liquid crystal molecules 140') of the alignment film (e.g., the first alignment film 141 or the second alignment film 142) relative to its lower surface (i.e., a surface of the first alignment film 141 or the second alignment film 142 away from the second liquid crystal molecules 140') in a process of performing the rubbing alignment process. For example, referring to FIGS. 2D and 2E, when rubbing is performed from left to right, slopes oblique to upper right or oblique to lower right are presented from left to right along the alignment direction of the alignment films (including the first alignment film 141 and the second alignment film 142). Although directions of the first pretilt angle α and the second pretilt angle β are different, the first alignment film 141 and the second alignment film 142 may be fabricated through a same process in practice. In a fabrication process, a state of the first alignment film 141 is as shown in FIG. 2D. In a using process, referring to FIG. 1A, since the first alignment film 141 and the second alignment film 142 are arranged opposite to each other, the directions of the first pretilt angle α and the second pretilt angle β are different, but in practice, a rubbing direction of the second alignment film 142 is the same as the rubbing direction of the first alignment film 141 in the fabrication process. In a case where the alignment direction of the third alignment film 151 is the same as the alignment direction of the first alignment film 141 and the alignment direction of the second alignment film 142, rubbing may be performed from left to right, or from right to left. When rubbing is performed from left to right, included angles oblique to upper right or oblique to lower right are presented from left to right along the alignment direction of the third alignment film 151. When rubbing is performed from right to left, included angles oblique to upper left (as shown in FIG. 2F) or oblique to lower left are presented from right to left along the alignment direction of the third alignment film 151. Based on this, the first liquid crystal molecules 150' proximate to the third alignment film 151 may have the third pretilt angle γ under action of the third alignment film 151. Therefore, the rubbing directions of the first alignment film 141, the second alignment film 142 and the third alignment film 151 may determine the alignment directions of the first alignment film 141, the second alignment film 142 and the third alignment film 151, and directions of the pretilt angles of the liquid crystal molecules, respectively.

It will be noted that each alignment direction may include two rubbing directions. For example, the alignment direction is the first direction, which may not only include a rubbing direction from one end to the other end in the first direction (as shown in FIG. 2D), but also include a rubbing direction along a path opposite to the "from one end to the other end" (shown in FIG. 2F).

Based on the above, it can be understood by those skilled in the art that the rubbing direction may determine a direction of pretilt angles. In a case where alignment directions of alignment films are the same, if rubbing directions are different, directions of pretilt angles may be different. For example, in a case where an alignment direction of an alignment film is the first direction, a direction of pretilt angles generated when rubbing is performed from left to right is opposite to a direction of pretilt angles generated when rubbing is performed from right to left.

Based on the above, in some embodiments, referring to FIGS. 1A to 1I, the direction of the first pretilt angle α is opposite to the direction of the second pretilt angle β.

The direction of the first pretilt angle α is opposite to the direction of the second pretilt angle β, which means that the direction of the first pretilt angle α and the direction of the second pretilt angle β are opposite relative to a same base substrate, e.g., the first base substrate 11.

Figure 1B:
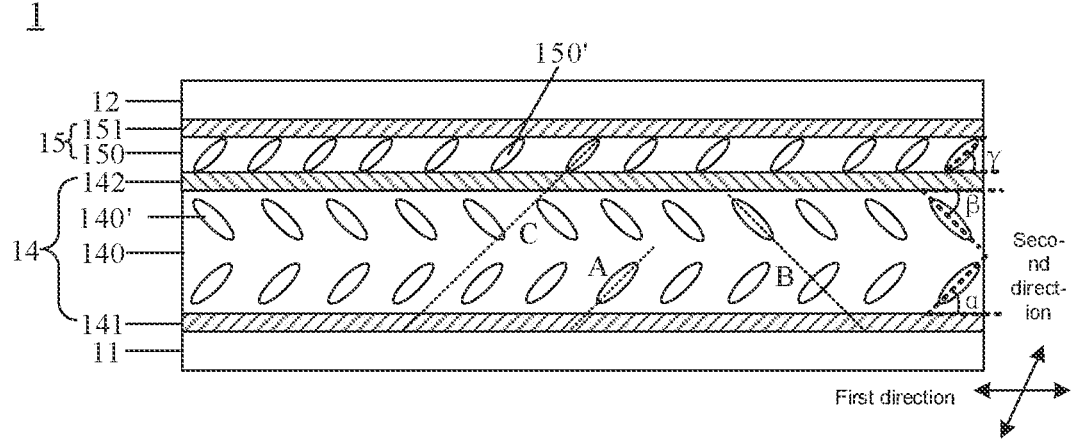
FIGS. 1B to 1I are schematic diagrams showing structures of other liquid crystal display panels, in accordance with the embodiments of the present disclosure.
Figure 1C:
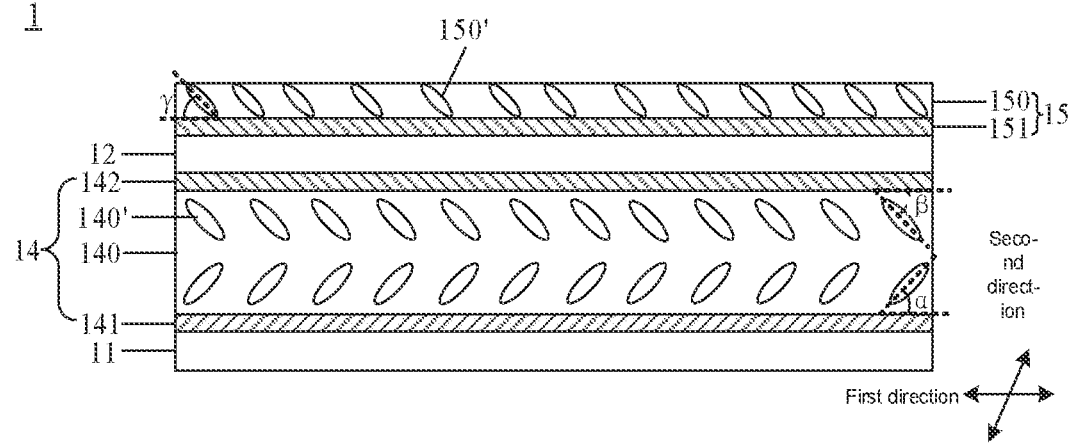
Figure 1D:
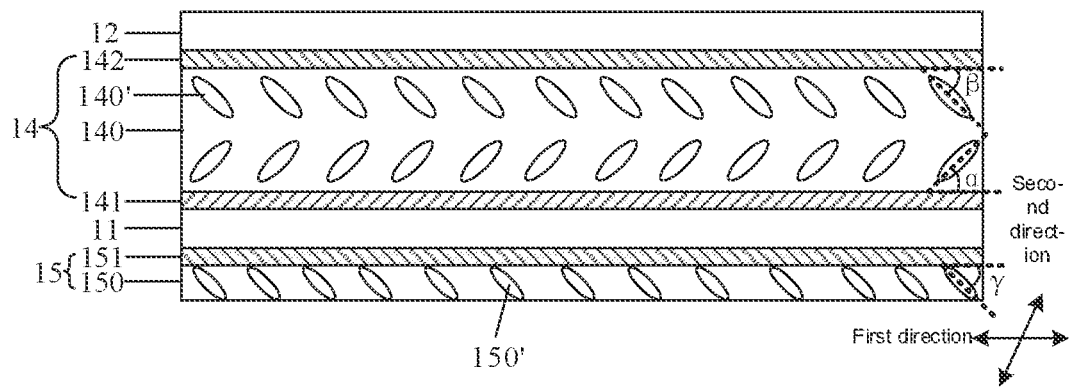
Figure 1E:
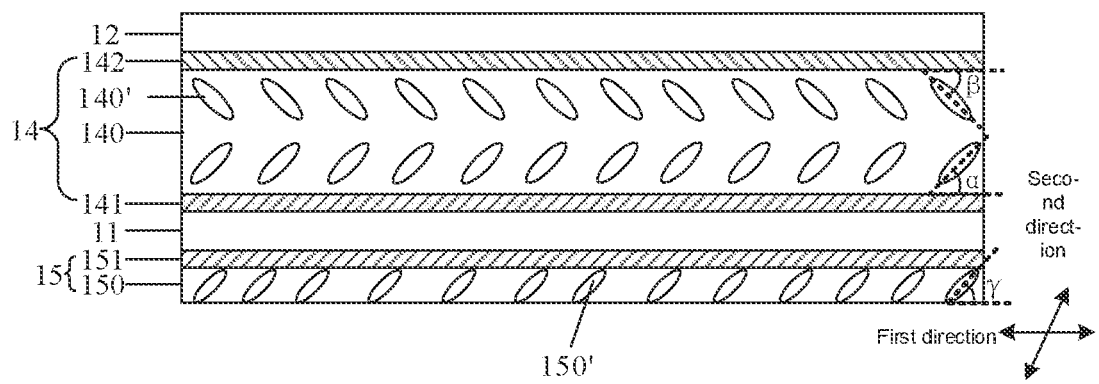
Figure 1F:
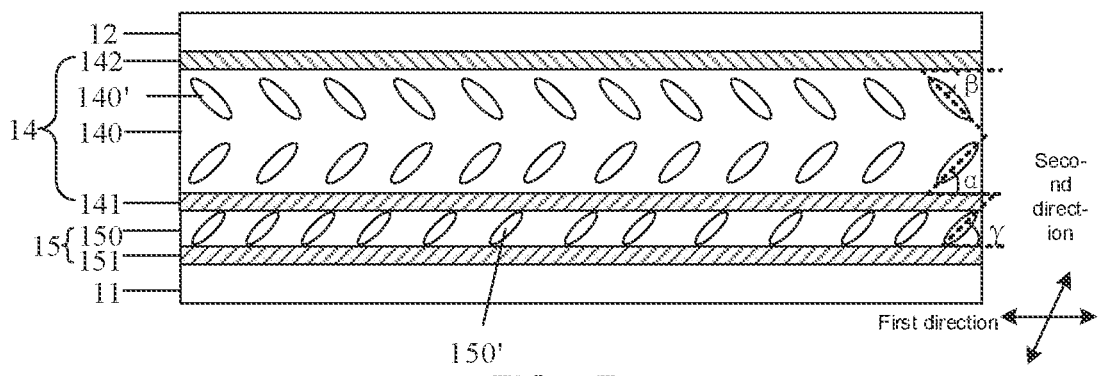
Figure 1G:
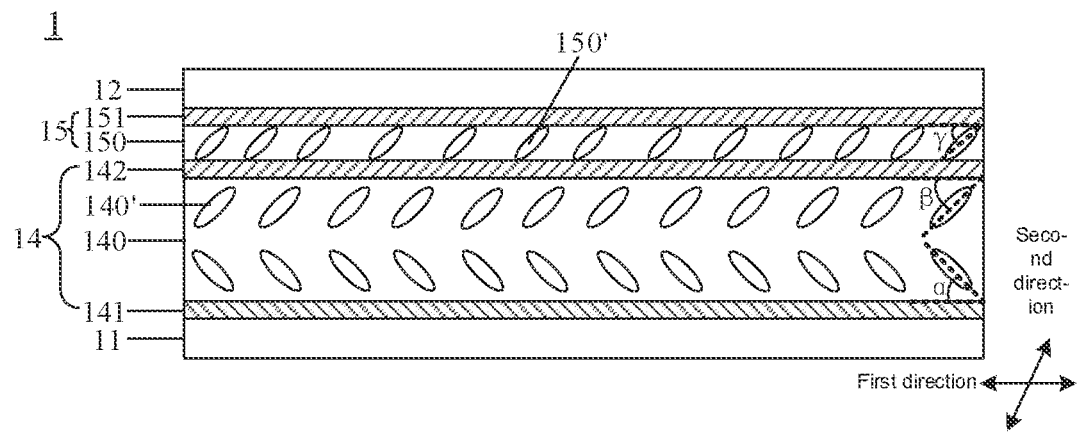
Figure 1I:
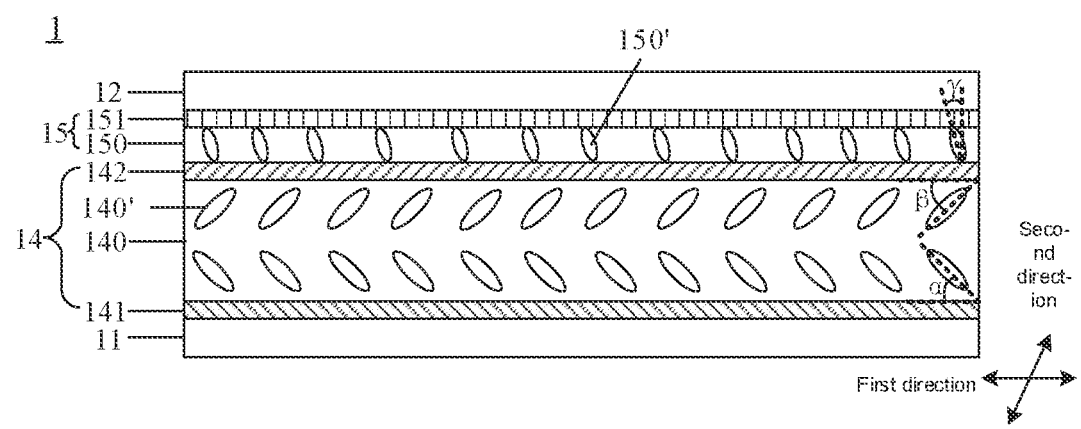
Figure 1J:
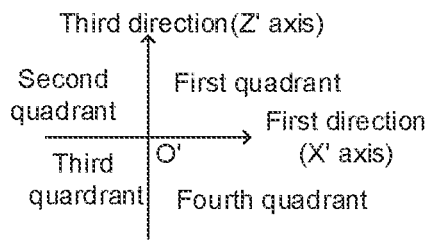
FIG. 1J is a schematic diagram of a first direction and a third direction, in accordance with the embodiments of the present disclosure.

Referring to FIG. 1J in combination with examples of the first pretilt angle α, the second pretilt angle β and the third pretilt angle γ in FIGS. 1A and 1B, a planar rectangular coordinate system X'O'Z' is established at an arbitrary point O' on a straight line, the straight line is located in the established coordinate system X'O'Z', and the O'-Z' direction is a thickness direction of the liquid crystal display panel 1. The rectangular coordinate system X'O'Z' is divided into four quadrants (a first quadrant in which x' is greater than 0 and z' is greater than 0, a second quadrant in which x' is less than 0 and z' is greater than 0, a third quadrant in which x' is less than 0 and z' is less than 0, and a fourth quadrant in which x' is greater than 0 and z' is less than 0). In a case where two straight lines both pass through the first quadrant and the third quadrant, directions of the two straight lines may be understood as the same, and further directions of two pretilt angles determined by the two straight lines are the same. In a case where two straight lines both pass through the second quadrant and the fourth quadrant, directions of the two straight lines may also be understood as the same, and further directions of two pretilt angles determined by the two straight lines are also the same. In a case where one straight line passes through the first quadrant and the third quadrant and the other straight line passes through the second quadrant and the fourth quadrant, directions of the two straight lines may be understood to be opposite, and further directions of two pretilt angles determined by the two straight lines are opposite.

Based on the above, referring to FIG. 1A, the straight line (the dotted line indicated by A in FIG. 1A) where the long axis of the second liquid crystal molecule 140' anchored by the first alignment film 141 is located passes through the first quadrant and the third quadrant as defined above. The straight line (the dotted line indicated by B in FIG. 1A) where the long axis of the second liquid crystal molecule 140' anchored by the second alignment film 142 is located passes through the second quadrant and the fourth quadrant as defined above. Therefore, the direction of the first pretilt angle α is opposite to the direction of the second pretilt angle β.

In a case where the direction of the first pretilt angle α is opposite to the direction of the second pretilt angle β, structures and fabrication processes of the first alignment film 141 and the second alignment film 142 may be completely the same, thereby reducing difficulty of fabricating the first alignment film 141 and the second alignment film 142.

In some embodiments, the direction of orthogonal projections of the long axes of the first liquid crystal molecules 150' on the plane where the third alignment film 151 is located is parallel to the direction of orthogonal projections of the long axes of the second liquid crystal molecules 140' anchored by the first alignment film 141 and the second alignment film 142 on the plane where the third alignment film 151 is located.

The direction of the orthogonal projections of the long axes of the first liquid crystal molecules 150' on the plane where the third alignment film 151 is located is parallel to the direction of the orthogonal projections of the long axes of the second liquid crystal molecules 140' anchored by the first alignment film 141 and the second alignment film 142 on the plane where the third alignment film 151 is located, which means that a straight line where the orthogonal projections of the long axes of the first liquid crystal molecules 150' on the plane of the third alignment film 151 is located is parallel to or overlapped with a straight line where the orthogonal projections of the long axes of the second liquid crystal molecules 140' anchored by the first alignment film 141 and the second alignment film 142 on the plane of the third alignment film 151 is located. In this case, the alignment direction of the third alignment film 151 is the first direction, and the optical compensation layer 15 is used to realize forward compensation for the liquid crystal layer 14.

Referring to FIGS. 1A to 1G, the direction of the orthogonal projections of the long axes of the first liquid crystal molecules 150' on the plane where the third alignment film 151 is located is parallel to the direction of the orthogonal projections of the long axes of the second liquid crystal molecules 140' anchored by the first alignment film 141 and the second alignment film 142 on the plane where the third alignment film 151 is located.

Based on the above, in a case where the alignment direction of the third alignment film 151 is the same as the alignment directions of the first alignment film 141 and the second alignment film 142, a direction of the third pretilt angle γ is the same as the direction of the first pretilt angle α or the direction of the second pretilt angle β, which means that the direction of the third pretilt angle γ is the same as the direction of the first pretilt angle α or the direction of the second pretilt angle β relative to the same base substrate, e.g., the first base substrate 11.

Similarly, referring to FIG. 1J in combination with examples of the first pretilt angle α, the second pretilt angle β and the third pretilt angle γ in FIGS. 1A and 1B, a planar rectangular coordinate system X'O'Z' is established at an arbitrarily point O' on a straight line, the straight line is located in the established coordinate system X'O'Z', and the O'-Z' direction is the thickness direction of the liquid crystal display panel 1. The rectangular coordinate system X'O'Z' is divided into four quadrants (a first quadrant in which x' is greater than 0 and z' is greater than 0, a second quadrant in which x' is less than 0 and z' is greater than 0, a third quadrant in which x' is less than 0 and z' is less than 0, and a fourth quadrant in which x' is greater than 0 and z' is less than 0). In a case where two straight lines both pass through the first quadrant and the third quadrant, directions of the two straight lines may be understood as the same, and further directions of two pretilt angles determined by the two straight lines are the same. In a case where two straight lines both pass through the second quadrant and the fourth quadrant, directions of the two straight lines may also be understood as the same, and further directions of two pretilt angles determined by the two straight lines are also the same. In a case where one straight line passes through the first quadrant and the third quadrant and the other straight line passes through the second quadrant and the fourth quadrant, directions of the two straight lines may be understood to be opposite, and further directions of two pretilt angles determined by the two straight lines are opposite.

In some embodiments, referring to FIG. 1A, in a case where the direction of the third pretilt angle γ is the same as the direction of the second pretilt angle β, a structure and a fabrication process of the third alignment film 151 are completely the same as structures and fabrication processes of the first alignment film 141 and the second alignment film 142.

In some embodiments, referring to FIG. 1B, in a case where the direction of the third pretilt angle γ is the same as the direction of the first pretilt angle α, on a basis that the alignment direction is the first direction, a rubbing direction of the third alignment film 151 is opposite to a rubbing direction of the first alignment film 141. For example, the rubbing direction of the third alignment film 151 is from right to left, and the rubbing direction of the first alignment film 141 is from left to right. Fabrication processes of the third alignment film 151 and the first alignment film 141 are similar and the alignment directions thereof are the same, which facilitates the fabrication thereof.

In some other embodiments, referring to FIGS. 1H and 1I, the direction of the orthogonal projections of the long axes of the first liquid crystal molecules 150' on the plane where the third alignment film 151 is located is perpendicular to the direction of the orthogonal projections of the long axes of the second liquid crystal molecules 140' anchored by the first alignment film 141 and the second alignment film 142 on the plane where the third alignment film 151 is located.

The direction of the orthogonal projections of the long axes of the first liquid crystal molecules 150' on the plane where the third alignment film 151 is located is perpendicular to the direction of the orthogonal projections of the long axes of the second liquid crystal molecules 140' anchored by the first alignment film 141 and the second alignment film 142 on the plane where the third alignment film 151 is located, which means that the straight line where the orthogonal projections of the long axes of the first liquid crystal molecules 150' on the plane of the third alignment film 151 is located is perpendicular to the straight line where the orthogonal projections of the long axes of the second liquid crystal molecules 140' anchored by the first alignment film 141 and the second alignment film 142 on the plane of the third alignment film 151 is located. In this case, the alignment direction of the third alignment film 151 is the second direction, and the optical compensation layer 15 is used to realize reverse compensation for the liquid crystal layer 14.

Referring to FIGS. 1H and 1I, the direction of the orthogonal projection of the long axis of the first liquid crystal molecule 150' on the plane where the third alignment film 151 is located is the second direction, and the direction of the orthogonal projection of the long axis of the second liquid crystal molecule 140' on the plane where the third alignment film 151 is located is the first direction, and thus the directions of the two orthogonal projections are perpendicular.

It can be understood by those skilled in the art that in a case where the direction of the orthogonal projection of the long axis of the first liquid crystal molecule 150' on the plane where the third alignment film 151 is located is perpendicular to the direction of the orthogonal projection of the long axis of the second liquid crystal molecule 140' on the plane where the third alignment film 151 is located, an orthogonal projection of the straight line where the long axis of the first liquid crystal molecule 150' is located on the plane where the third alignment film 151 is located is perpendicular to an orthogonal projection of the straight line where the long axis of the second liquid crystal molecule 140' is located on the plane where the third alignment film 151 is located.

A relationship between the alignment direction of the third alignment film 151 and the alignment directions of the first alignment film 141 and the second alignment film 142 determines a compensation effect of the optical compensation layer 15, and how the optical compensation layer 15 realizes forward compensation and reverse compensation will be described in detail below on a basis of a comparison with the related art.

Figure 3A:
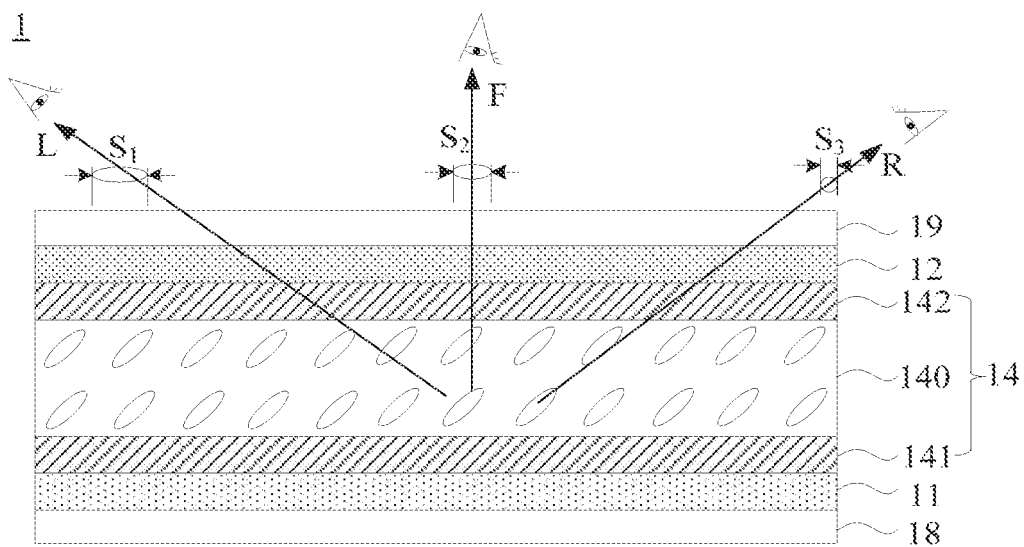
FIG. 3A is a schematic diagram showing a structure of a liquid crystal display panel in the related art.
Figure 3B:
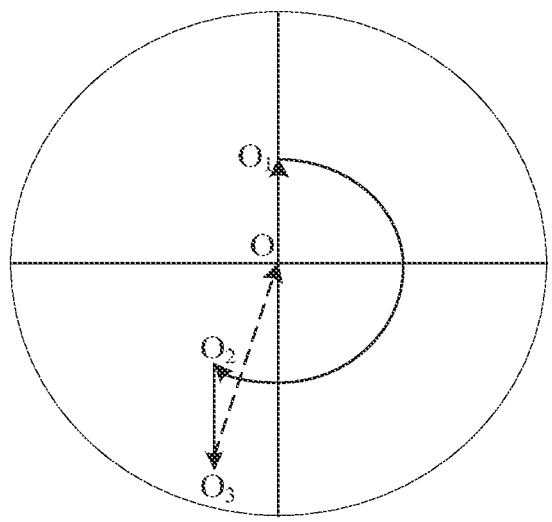
FIG. 3B is a schematic diagram showing positions of polarization states of light passing through layers in a liquid crystal display panel in a Poincare sphere diagram in the related art.

A liquid crystal display panel 1 in the related art (as shown in FIG. 3A) has a light leakage problem in an L0 state, which refers to a state in which the liquid crystal display panel 1 is in a dark state when no voltage is applied thereto, and the backlight module normally provides light. When the liquid crystal display panel 1 is in the L0 state, and pressure (e.g., pressure generated by pressing) is applied to the liquid crystal display panel 1, the liquid crystal display panel 1 is deformed. A first base substrate 11 in an array substrate and a second base substrate 12 in a color filter substrate are deformed due to the pressure and further generate a non-uniform stress, which may change a polarization state of light in the liquid crystal display panel 1. However, the first base substrate 11 and the second base substrate 12 change the polarization state of the light in the same magnitude and opposite directions, thereby achieving mutual cancellation. For example, as for the structure of the liquid crystal display panel 1 in FIG. 3A, referring to the Poincare sphere diagram shown in FIG. 3B, along an exit direction of light, after light exiting from the backlight module passes through a first polarizer 18, the polarization state of the light is at the point O, and in this case, the light is linearly polarized light. After the light passes through the first base substrate 11, the polarization state of the light is at the point $O_1$ under influence of the non-uniform stress, and in this case, the light is elliptically polarized light. After the light passes through a liquid crystal layer 14, the light is modulated by liquid crystal molecules, and the polarization state of the light is at the point $O_2$, and in this case, the light is elliptically polarized light. After the light passes through the second base substrate 12, the polarization state of the light is at the point $O_3$ under the influence of the non-uniform stress, and in this case, the light is elliptically polarized light. There is a distance between the point $O_3$ and the point O, that is, the light entering a second polarizer 19 is elliptically polarized light rather than linearly polarized light, which thus causes a part of the elliptically polarized light to exit from the second polarizer 19, and as a result, the light leakage problem occurs in the liquid crystal display panel 1.

In addition, the liquid crystal display panel 1 in the related art also has a problem of light shift. Since the liquid crystal molecules are made of a birefringent material, a phenomenon of birefringence (there are two light components in a long axis direction and a short axis direction) is generated when light enters tilted liquid crystal molecules, which causes a difference in Δn when the liquid crystal display panel 1 is viewed at different positions, and further leads to a difference in transmittance of light with different wavelengths. Here, Δn is a difference between a refractive index $n_e$ of extraordinary light and a refractive index $n_o$ of ordinary light, where the ordinary light is light that obeys the law of refraction, and the extraordinary light is light that does not obey the law of refraction. For positive liquid crystal molecules, the refractive index $n_0$ of the ordinary light corresponds to short axes of the liquid crystal molecules no matter what direction light propagates in, and thus the refractive index $n_0$ of the ordinary light is constant; the refractive index $n_e$ of the extraordinary light changes with a direction where light travels, and corresponds to a long axis direction of the liquid crystal molecules. Referring to FIG. 3A, when the liquid crystal display panel 1 is viewed at a left side of the liquid crystal display panel 1, the viewed light exits in the direction of the arrow L, when the liquid crystal display panel 1 is viewed at a right side of the liquid crystal display panel 1, the viewed light exits in the direction of the arrow R, and when the liquid crystal display panel 1 is viewed at a front side of the liquid crystal display panel 1, the viewed light exits in the direction of the arrow F. When the liquid crystal display panel 1 is viewed at different positions, effective paths of light passing through the liquid crystal molecule in the liquid crystal layer 14 may be different. For example, when the liquid crystal display panel 1 is viewed at the left side, an effective path of light passing through the liquid crystal molecule is $S_1$; when the liquid crystal display panel 1 is viewed at the front side, an effective path of the light passing through the liquid crystal molecule is $S_2$; and when the liquid crystal display panel 1 is viewed at the right side, an effective path of the light passing through the liquid crystal molecule is $S_3$. $S_1$ is greater than $S_2$ and $S_2$ is greater than $S_3$ ($S_1 > S_2 > S_3$). When the effective paths of the light passing through the liquid crystal molecule are different, Δn will be affected and changed. Since $n_0$ is constant, and $n_e$ corresponds to the long axis of the liquid crystal molecule, Δn1 is less than Δn2 and Δn2 is less than Δn3 (Δn₁<Δn₂<Δn3), where Δn1 is Δn at the left side, Δn2 is Δn at the front side, and Δn3 is Δn at the right side. However, magnitudes of change between $S_1$, $S_2$ and $S_3$ are not the same as magnitudes of change between Δn1, Δn2 and Δn3, and thus for the liquid crystal display panel 1, a product of Δn1 and $S_1$ is not equal to a product of Δn2 and $S_2$, and the product of Δn2 and $S_2$ is not equal to a product of Δn3 and $S_3$ (Δn1×$S_1$≠Δn2×$S_2$≠Δn3×$S_3$). As a result, a color of the liquid crystal display panel 1 viewed from the left side of the liquid crystal display panel 1 is different from a color of the liquid crystal display panel 1 viewed from the right side of the liquid crystal display panel 1. Thus, the liquid crystal display panel 1 has a color cast problem.

Therefore, the liquid crystal display panel 1 in the related art has the light leakage problem in the L0 state and the color cast problem. However, when the liquid crystal display panel in the embodiments of the present disclosure is in the L0 state, a change in the polarization state of light due to the non-uniform stress generated by deformation of the first base substrate 11 and the second base substrate 12 may be mutually cancelled, and the optical compensation layer 15 may forward or reversely compensate for the change in the polarization state of light caused by the liquid crystal layer 14, so that light exiting from the second base substrate 12 is linearly polarized light. When the light exiting from the second base substrate 12 is the linearly polarized light, the linearly polarized light will not exit from the liquid crystal display panel 1 even if pressure is applied to the liquid crystal display panel 1. Therefore, the liquid crystal display panel 1 in the embodiments of the present disclosure does not have the light leakage problem in the L0 state.

The reason why the liquid crystal display panel 1 does not have the light leakage problem in the L0 state is explained as follows. Since polarizers in the liquid crystal display panel 1 also affect the polarization state of light, in order to facilitate an analysis of the state of light in the liquid crystal display panel 1, it is necessary to conduct an analysis in a case where the liquid crystal display panel 1 further includes the first polarizer disposed on a side of the first base substrate 11 away from the liquid crystal layer 14 and the second polarizer disposed on a side of the second base substrate 12 away from the liquid crystal layer 14.

In a case where the alignment directions of the first alignment film 141 and the second alignment film 142 are the same as the alignment direction of the third alignment film 151 (i.e., the first direction), the optical compensation layer 15 may forward compensate for the change in the polarization state of light caused by the liquid crystal layer 14. That is, the optical compensation layer 15 functions as forward compensation. Referring to the Poincare sphere diagram shown in FIG. 4A, along an exit direction of light, after light exiting from the backlight module passes through the first polarizer, the polarization state of the light is located at the point O, and in this case, the light is linearly polarized light. After the light passes through the first base substrate 11, the polarization state of the light is located at the point $O_1$ under the influence of the non-uniform stress, and in this case, the light is elliptically polarized light. After the light passes through the liquid crystal layer 14, under modulation of phase retardation of the light by the second liquid crystal molecular layer 140, the polarization state of the light is located at the point $O_2$, and in this case, the light is elliptically polarized light. After the light passes through the optical compensation layer 15, under modulation of phase retardation of the light by the first liquid crystal molecular layer 150, the polarization state of the light is located at the point $O_3$ that coincides with the point $O_1$, and in this case, the light is elliptically polarized light. After the light passes through the second base substrate 12, the polarization state of the light is located at the point O under the influence of the non-uniform stress, and in this case, the light becomes the linearly polarized light again, and thus the light entering the second polarizer is the linearly polarized light. In the L0 state, even if pressure is applied to the liquid crystal display panel 1, the linearly polarized light cannot exit from the second polarizer, and thus the light leakage phenomenon generated when the liquid crystal display panel 1 is stressed is avoided, and the optical compensation layer 15 may play a certain compensation role at different viewing angles.

In a case where the alignment directions of the first alignment film 141 and the second alignment film 142 are perpendicular to the alignment direction of the third alignment film 151, the optical compensation layer 15 may reversely compensate for the change in the polarization state of light caused by the liquid crystal layer 14. That is, the optical compensation layer 15 functions as reverse compensation. Referring to the Poincare sphere diagram shown in FIG. 4B, along an exit direction of light, after light exiting from the backlight module passes through the first polarizer, the polarization state of the light is located at the point O, and in this case, the light is linearly polarized light. After the light passes through the first base substrate 11, the polarization state of the light is located at the point $O_1$ under the influence of the non-uniform stress, and in this case, the light is elliptically polarized light. After the light passes through the liquid crystal layer 14, under modulation of the phase retardation of the light by the second liquid crystal molecular layer 140, the polarization state of the light is located at the point $O_2$, and in this case, the light is elliptically polarized light. After the light passes through the optical compensation layer 15, under modulation of the phase retardation of the light by the first liquid crystal molecular layer 150, the polarization state of the light is located at the point $O_3$, and in this case, the light is elliptically polarized light, and the polarization state $O_3$ coincides with the polarization state $O_1$. After the light passes through the second base substrate 12, the polarization state of the light is located at the point O under the influence of the non-uniform stress, and in this case, the light becomes the linearly polarized light again, and thus the light entering the second polarizer is the linearly polarized light. In the L0 state, even if pressure is applied to the liquid crystal display panel 1, the linearly polarized light cannot exit from the second polarizer, and thus the light leakage phenomenon generated when the liquid crystal display panel 1 is stressed is avoided, and the optical compensation layer 15 may play a certain compensation role at different viewing angles.

Figure 4A:
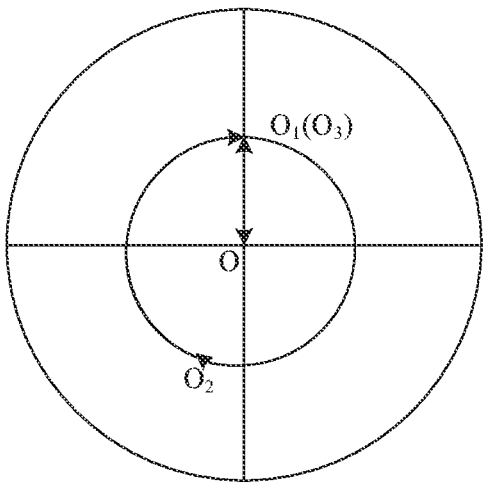
FIG. 4A is a diagram showing positions of polarization states of light passing through layers in a liquid crystal display panel in a Poincare sphere diagram, in accordance with the embodiments of the present disclosure.
Figure 4B:
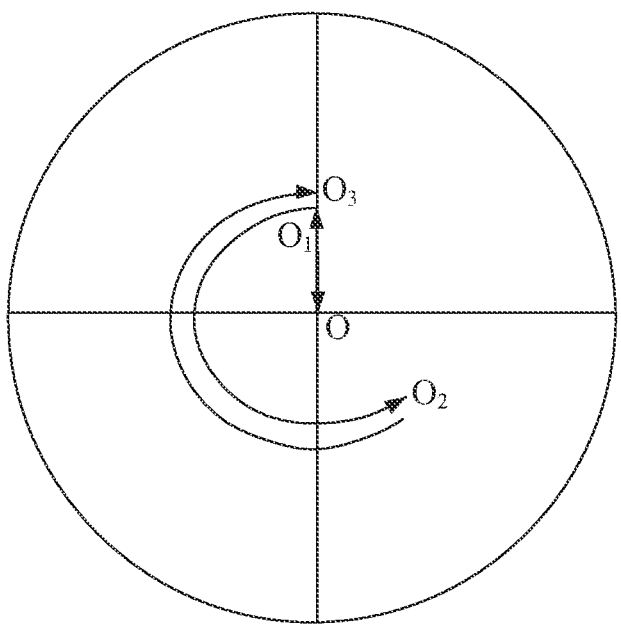
FIG. 4B is a diagram showing positions of polarization states of light passing through layers in another liquid crystal display panel in a Poincare sphere diagram, in accordance with the embodiments of the present disclosure.

In FIG. 4B, a certain distance exists between the polarization state $O_3$ and the polarization state $O_1$ only to show a relationship between the polarization state $O_1$ to the polarization state $O_2$ and the polarization state $O_2$ to the polarization state $O_3$. In fact, the polarization state $O_3$ coincides with the polarization state $O_1$.

Referring to FIG. 4A, in a case where the optical compensation layer 15 performs forward compensation, the polarization state $O_1$, the polarization state $O_2$ and the polarization state $O_3$ move clockwise to form a circle. Referring to FIG. 4B, in a case where the optical compensation layer 15 performs reverse compensation, the polarization state $O_1$ moves counterclockwise to the polarization state $O_2$, and the polarization state $O_2$ moves clockwise to the polarization state $O_3$, and amplitudes from $O_1$ to $O_2$ and from $O_2$ to $O_3$ are the same, so that the polarization state $O_3$ returns back to the polarization state $O_1$. Therefore, by using the optical compensation layer 15 to compensate for the phase retardation of the liquid crystal layer 14, the light leakage problem of the liquid crystal display panel 1 in the L0 state may be solved.

A retardation amount of the optical compensation layer 15 may be adjusted by adjusting relevant parameters (e.g., refractive index property and thickness) of the first liquid crystal molecular layer 150, thereby realizing forward compensation or reverse compensation of the optical compensation layer 15.

Referring to FIGS. 4A and 4B, the phase retardation of the liquid crystal layer 14 is forward or reversely compensated through phase retardation generated after adding the optical compensation layer 15, so that the polarization state of the light exiting from the optical compensation layer 15 moves from the point $O_2$ to the point $O_3$, and the point $O_3$ coincides with the point $O_1$, thereby solving the light leakage problem at a front viewing angle in the L0 state. Moreover, the optical compensation layer 15 may play a certain compensation role at different viewing angles, and thus a light leakage luminance of the liquid crystal display panel 1 in the embodiments of the present disclosure is smaller than a light leakage luminance of the liquid display panel 1 in the related art when the liquid crystal display panel 1 is viewed from the left side and the right side. When the liquid crystal display panel 1 is viewed from the left side and the right side, a display effect of the liquid crystal display panel 1 may be measured by means of color cast. Therefore, a color cast degree of the liquid crystal display panel 1 in the embodiments of the present disclosure is lower than a color cast degree of the liquid crystal display panel 1 in the related art, and a display effect of the liquid crystal display panel 1 in the embodiments of the present disclosure is better than a display effect of the liquid crystal display panel 1 in the related art. It will be noted that, the light leakage in the L0 state may be a phenomenon occurring when the liquid crystal display panel 1 is viewed from the front viewing angle, but the color cast may be a phenomenon occurring when the liquid crystal display panel 1 is viewed from the left side or the right side (a side viewing angle) in the L0 state, and the color cast may only be perceived by human eyes due to light leakage. Therefore, in the embodiments of the present disclosure, the light leakage luminance of the liquid crystal display panel 1 is reduced, and a luminance corresponding to the color cast may also be reduced, thereby improving the display effect of the liquid crystal display panel 1.

Referring to FIGS. 1H and 1I, it can be seen from the above analysis, the structure shown in FIGS. 1H and 1I solves the light leakage problem at the front viewing angle in the L0 state by utilizing the reverse compensation. The optical compensation layer 15 may play a certain compensation role at different viewing angles, and thus the light leakage luminance of the liquid crystal display panel 1 in the embodiments of the present disclosure is smaller than the light leakage luminance of the liquid display panel 1 in the related art when the liquid crystal display panel 1 is viewed from the left side and the right side. In addition, a tilt direction of the second liquid crystal molecules 140' anchored by the first alignment film 141 is opposite to a tilt direction of the second liquid crystal molecules 140' anchored by the second alignment film 142, so that as for the liquid crystal layer 14, the effective path $S_1$ when the liquid crystal display panel 1 is viewed from the left side is equal to the effective path $S_3$ when the liquid crystal display panel 1 is viewed from the right side, and further $\Delta n1$ at the left side of the liquid crystal display panel 1 is equal to $\Delta n3$ at the right side thereof, and a product of $\Delta n1$ and $S_1$ is equal to a product of $\Delta n3$ and $S_3$ ($\Delta n1 \times S_1 = \Delta n3 \times S_3$). On this basis, since the alignment direction of the third alignment film 151 is perpendicular to the alignment directions of the first alignment film 141 and the second alignment film 142, and tilt directions of the first liquid crystal molecules 150' are the same, $\Delta n1 \times S_1$ at the left side and $\Delta n3 \times S_3$ at the right side are not affected. As a result, display effects viewed from the left side and the right side of the liquid crystal display panel 1 are the same. Therefore, the liquid crystal display panel 1 in the embodiments of the present disclosure may solve the color cast problem.

Based on the above, no matter whether the alignment direction of the third alignment film 151 is the same as or perpendicular to the alignment directions of the first alignment film 141 and the second alignment film 142, since the optical compensation layer 15 may improve the light leakage phenomenon in the L0 state, and by virtue of the compensation effect of the optical compensation layer 15 at different viewing angles, the light leakage luminance of the liquid crystal display panel 1 in the embodiments of the present disclosure is smaller than the light leakage luminance of the liquid display panel 1 in the related art when the liquid crystal display panel 1 is viewed from the left side and the right side. The smaller the light leakage luminance is, the lower the luminance of the liquid crystal panel 1 is, and thus a display difference between different display regions that may be perceived by human eyes is smaller and less obvious when the liquid crystal panel 1 is viewed. That is, the smaller the light leakage luminance is, the lower the color cast degree is when the liquid crystal display panel 1 displays images. Therefore, the color cast degree of the liquid crystal display panel 1 in the embodiments of the present disclosure is lower than the color cast degree of the liquid crystal display panel 1 in the related art, and the display effect of the liquid crystal display panel 1 in the embodiments of the present disclosure is better than the display effect of the liquid crystal display panel 1 in the related art.

In some embodiments, referring to FIGS. 1A to 1I, the first pretilt angle $\alpha$, the second pretilt angle $\beta$ and the third pretilt angle $\gamma$ are equal in magnitude.

The first pretilt angle $\alpha$, the second pretilt angle $\beta$ and the third pretilt angle $\gamma$ are equal in magnitude, which means that degrees of the pretilt angles are equal regardless of the alignment directions of the alignment films (including the first alignment film 141, the second alignment film 142 and the third alignment film 143). No matter whether the alignment direction of the third alignment film 151 is the same as or perpendicular to the alignment directions of the first alignment film 141 and the second alignment film 142, a magnitude of the third pretilt angle $\gamma$ may be set to be equal to or approximately equal to a magnitude of the first pretilt angle $\alpha$ and the second pretilt angle $\beta$.

In a case where the first pretilt angle $\alpha$, the second pretilt angle $\beta$ and the third pretilt angle $\gamma$ are equal or approximately equal, the difficulty in fabricating each alignment film may be reduced.

In some embodiments, the first pretilt angle $\alpha$, the second pretilt angle $\beta$ and the third pretilt angle $\gamma$ are in a range of $2° \pm 2°$.

In some other embodiments, the first pretilt angle $\alpha$, the second pretilt angle $\beta$ and the third pretilt angle $\gamma$ are in a range of $2° \pm 1°$.

On this basis, the first pretilt angle $\alpha$, the second pretilt angle $\beta$ and the third pretilt angle $\gamma$ are all, for example, 2°.

In some embodiments, the first pretilt angle $\alpha$, the second pretilt angle $\beta$ and the third pretilt angle $\gamma$ are all, for example, 1° or 3°.

Since the degrees of the first pretilt angle $\alpha$, the second pretilt angle $\beta$ and the third pretilt angle $\gamma$ are all small, for example, 1°, even if the direction of the first pretilt angle $\alpha$ is different from the direction of the second pretilt angle $\beta$, the long axis direction of the second liquid crystal molecules 140' proximate to the first alignment film 141 is approximately parallel to the long axis direction of the second liquid crystal molecules 140' proximate to the second alignment film 142. In a case where the alignment direction of the third alignment film 151 is the same as the alignment direction of the first alignment film 141, the long axis direction of the first liquid crystal molecules 150' is approximately the same as the long axis direction of the second liquid crystal molecules 140' anchored by the first alignment film 141 and the second alignment film 142. In a case where the alignment direction of the third alignment film 151 is perpendicular to the alignment direction of the first alignment film 141, the long axis direction of the first liquid crystal molecules 150' is approximately perpendicular to the long axis direction of the second liquid crystal molecules 140' anchored by the first alignment film 141 and the second alignment film 142. The long axis direction of the first liquid crystal molecules 150' is parallel to the long axis direction of the second liquid crystal molecules 140', so that the optical compensation layer 15 may realize forward compensation for the liquid crystal layer 14. The long axis direction of the first liquid crystal molecules 150' is perpendicular to the long axis direction of the second liquid crystal molecules 140', so that the optical compensation layer 15 may realize reverse compensation for the liquid crystal layer 14. Both the forward compensation and the reverse compensation may solve the light leakage problem of the liquid crystal display panel 1 in the L0 state and improve the color cast phenomenon of the liquid crystal display panel 1.

Based on the above, regardless of the magnitudes of the first pretilt angle $\alpha$ and the second pretilt angle $\beta$, the orthogonal projections of the long axes of the second liquid crystal molecules 140' on a plane where the first alignment film 141, the second alignment film 142 or the third alignment film 151 is located are all in the first direction. Regardless of the magnitude of the third pretilt angle $\gamma$, in a case where the alignment direction of the third alignment film 151 is the same as the alignment directions of the first alignment film 141 and the second alignment film 142, the orthogonal projections of the long axes of the first liquid crystal molecules 150' on the plane where the first alignment film 141, the second alignment film 142 or the third alignment film 151 is located are also in the first direction. In a case where the alignment direction of the third alignment film 151 is perpendicular to the alignment directions of the first alignment film 141 and the second alignment film 142, the orthogonal projections of the long axes of the first liquid crystal molecules 150' on the plane where the first alignment film 141, the second alignment film 142 or the third alignment film 151 is located are all in the second direction. Therefore, even if the fabricated first pretilt angle $\alpha$, second pretilt angle $\beta$ and third pretilt angle $\gamma$ are different in magnitude, the liquid crystal layer 14 and the optical compensation layer 15 may also be ensured to work normally, which reduces process requirements for fabricating the first pretilt angle $\alpha$, the second pretilt angle $\beta$ and the third pretilt angle $\gamma$.

The liquid crystal layer 14 includes the second liquid crystal molecular layer 140, and a refractive index of the second liquid crystal molecular layer 140 satisfies a condition that $n_{xLC}$ is greater than $n_{yLC}$ and $n_{yLC}$ is approximately equal to $n_{zLC}$ ($n_{xLC} > n_{yLC} \approx n_{zLC}$), or a condition that $n_{xLC}$ is greater than $n_{yLC}$ and $n_{yLC}$ is equal to $n_{zLC}$ ($n_{xLC} > n_{yLC} = n_{zLC}$), where $n_{xLC}$ is a refractive index of the second liquid crystal molecular layer 140 in the X-axis direction in the plane thereof, $n_{yLC}$ is a refractive index of the second liquid crystal molecular layer 140 in the Y-axis direction perpendicular to the X-axis in the plane thereof, and $d_{LC}$ is a thickness of the second liquid crystal molecular layer 140. The X axis is an optical axis of the second liquid crystal molecule in the second liquid crystal molecular layer 140. It will be noted that, in a case where the X axis and the second liquid crystal molecular layer 140 have a small tilt angle (e.g., a tilt angle less than or equal to 5°) therebetween, the X axis may be considered to be in the plane of the second liquid crystal molecular layer 140. An in-plane retardation $R_{OLC}$ of the second liquid crystal molecular layer 140 is equal to a product of $d_{LC}$ and a difference of $n_{xLC}$ and $n_{yLC}$ ($R_{OLC} = (n_{xLC} - n_{yLC}) \times d_{LC}$). The in-plane retardation of the second liquid crystal molecular layer 140 may be understood as an actual retardation of light passing through the second liquid crystal molecular layer 140 in a normal direction (vertical direction). It can be understood that since the phase retardation of the liquid crystal layer 14 is determined by the second liquid crystal molecular layer 140, the in-plane retardation of the second liquid crystal molecular layer 140 may be regarded as the in-plane retardation of the liquid crystal layer 14.

The optical compensation layer 15 includes the first liquid crystal molecular layer 150. A refractive index of the first liquid crystal molecular layer 150 satisfies a condition that $n_{x1}$ is greater than $n_{y1}$ and $n_{y1}$ is approximately equal to $n_{z1}$ ($n_{x1} > n_{y1} \approx n_{z1}$), or a condition that $n_{x1}$ is greater than $n_{y1}$ and $n_{y1}$ is equal to $n_{z1}$ ($n_{x1} > n_{y1} = n_{z1}$), where $n_{x1}$ is a refractive index of the first liquid crystal molecular layer 150 in an $X_1$-axis direction in the plane thereof, $n_{y1}$ is a refractive index of the first liquid crystal molecular layer 150 in a $Y_1$-axis direction perpendicular to the $X_1$-axis in the plane thereof, and $n_{z1}$ is a refractive index of the first liquid crystal molecular layer 150 in a thickness direction thereof. The $X_1$ axis is an optical axis of the first liquid crystal molecule in the first liquid crystal molecular layer 150. It will be noted that, in a case where the $X_1$ axis and the first liquid crystal molecular layer 150 have a small tilt angle (e.g., a tilt angle less than or equal to 5°) therebetween, the $X_1$ axis may be considered to be in the plane of the first liquid crystal molecular layer 150. It can be understood that in the case where the $X_1$ axis and the first liquid crystal molecular layer 150 have the small tilt angle therebetween, there is a certain difference between $n_{y1}$ and $n_{z1}$, and in view of the above situation, $n_{y1}$ may be equal to or approximately equal to $n_{z1}$. An in-plane retardation $R_{O1}$ of the first liquid crystal molecular layer 150 is equal to a product of $d_1$ and a difference of $n_{x1}$ and $n_{y1}$ ($R_{O1} = (n_{x1} - n_{y1}) \times d_1$), where $n_{x1}$ is the refractive index of the first liquid crystal molecular layer 150 in the $X_1$-axis direction in the plane thereof, $n_{y1}$ is the refractive index of the first liquid crystal molecular layer 150 in the $Y_1$-axis direction perpendicular to the $X_1$-axis in the plane thereof, and $d_1$ is a thickness of the first liquid crystal molecular layer 150. $R_{O1}$ is the in-plane retardation of the first liquid crystal molecular layer 150, which may be understood as an actual retardation of light passing through the first liquid crystal molecular layer 150 in a normal direction (vertical direction). It can be understood that phase retardation of the optical compensation layer 15 is determined by the first liquid crystal molecular layer 150, and the in-plane retardation of the first liquid crystal molecular layer 150 may be regarded as the in-plane retardation of the optical compensation layer 15. On this basis, it can be understood that the optical compensation layer 15 may be regarded as a +A compensation film layer.

In some embodiments, in a case where the direction of orthogonal projections of the long axes of the first liquid crystal molecules 150' on the plane where the third alignment film 151 is located is parallel to the direction of the orthogonal projections of the long axes of the second liquid crystal molecules 140' anchored by the first alignment film 141 and the second alignment film 142 on the plane where the third alignment film 151 is located, a sum of the in-plane retardation of the optical compensation layer 15 and the in-plane retardation of the liquid crystal layer 14 is equal to a positive integral multiple of a first wavelength, and the first wavelength is in a range of 535 nm±50 nm. In this structure, the optical compensation layer 15 plays a role of forward compensation. Therefore, a transmittance of light in the liquid crystal display panel 1 may be controlled by controlling the sum of the in-plane retardation of the optical compensation layer 15 and the in-plane retardation of the liquid crystal layer 14.

By adjusting refractive index properties of liquid crystal molecules in the optical compensation layer 15 and/or the liquid crystal layer 14 and thicknesses of the optical compensation layer 15 and/or the liquid crystal layer 14, the sum of the in-plane retardation of the optical compensation layer 15 and the in-plane retardation of the liquid crystal layer 14 may be equal to a positive integral multiple of the first wavelength.

For example, the first wavelength is in a range of 535 nm±50 nm, that is, a minimum value of the first wavelength is 485 nm, a maximum value thereof is 585 nm, and a median value thereof is 535 nm. In a case where the sum of the in-plane retardation of the optical compensation layer 15 and the in-plane retardation of the liquid crystal layer 14 is 535 nm, the light leakage at the front viewing angle and the side viewing angle may be reduced significantly when the liquid crystal display panel 1 is in the L0 state, and the leaked light may be bluish when the liquid crystal display panel 1 is viewed from the side viewing angle. Compared with color cast of red, yellow and green, the color cast of blue is more easily accepted by people. Therefore, by setting the first wavelength to be in the range of 535 nm±50 nm, the display effect is further improved.

Figure 5:
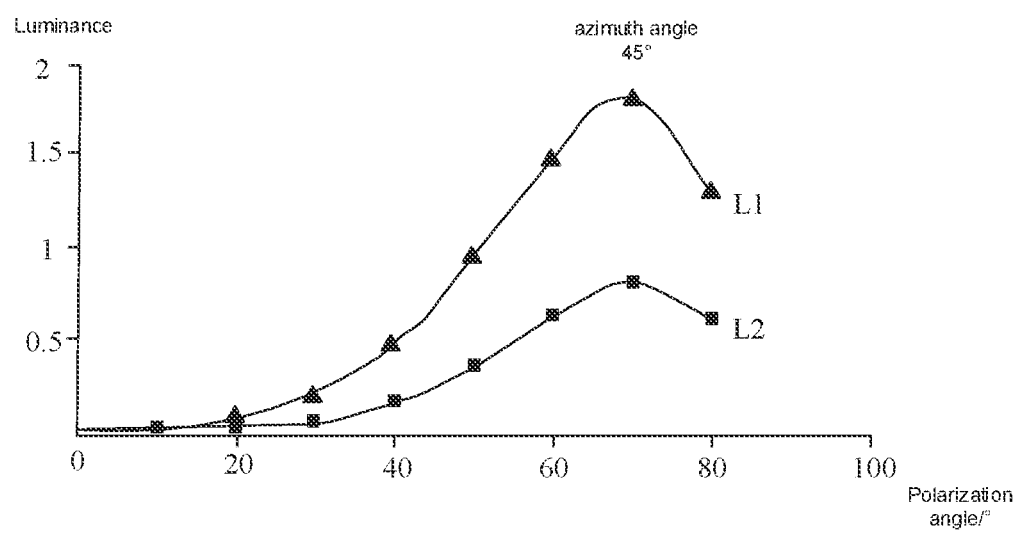
FIG. 5 is a schematic diagram showing a comparison between a polarization angle-luminance curve of a liquid crystal display panel in accordance with the embodiments of the present disclosure and a polarization angle-luminance curve of a liquid crystal display panel in the related art.

Through experimental verification, in a case where the liquid crystal display panel 1 in the related art (as shown in FIG. 3A) is viewed at different polarization angle positions under a condition that azimuth angles are all 45°, a curve of luminance changing with the polarization angles is L1 (as shown in FIG. 5) when a light leakage phenomenon occurs in the liquid crystal display panel 1. In a case where the liquid crystal display panel 1 adopting the structure in FIG. 1A in the embodiments of the present disclosure is viewed at different polarization angle positions, a curve of luminance changing with the polarization angles is L2 (as shown in FIG. 5) when a light leakage phenomenon occurs in the liquid crystal display panel 1. It can be clearly seen from FIG. 5, when the light leakage phenomenon occurs in the liquid crystal display panel 1 in the embodiments of the present disclosure, the light leakage luminance of the liquid crystal display panel 1 in the embodiments of the present disclosure is lower, and thus the light leakage phenomenon of the liquid crystal display panel 1 in the embodiments of the present disclosure is less obvious than the liquid crystal display panel 1 in the related art, that is, a quality of the liquid crystal display panel 1 in the embodiments of the present disclosure is better.

In some embodiments, in the case where the direction of the orthogonal projections of the long axes of the first liquid crystal molecules 150' on the plane where the third alignment film 151 is located is parallel to the direction of the orthogonal projections of the long axes of the second liquid crystal molecules 140' on the plane where the third alignment film 151 is located, the in-plane retardation of the optical compensation layer 15 is in a range of 185 nm±25 nm, and the in-plane retardation of the liquid crystal layer 14 is in a range of 350 nm±25 nm. For example, a minimum value of the in-plane retardation of the optical compensation layer 15 is 160 nm, a maximum value thereof is 210 nm, and a median value thereof is 185 nm. For example, a minimum value of the in-plane retardation of the liquid crystal layer 14 is 325 nm, a maximum value thereof is 375 nm, and a median value thereof is 350 nm.

On this basis, in some other embodiments, the sum of the in-plane retardation of the optical compensation layer 15 and the in-plane retardation of the liquid crystal layer 14 is equal to a positive integer multiple of a first wavelength, and the first wavelength is in a range of 535 nm±25 nm.

In some embodiments, the sum of the in-plane retardation of the optical compensation layer 15 and the in-plane retardation of the liquid crystal layer 14 is equal to a positive integer multiple of a first wavelength, and the first wavelength is 535 nm. In some other embodiments, in the case where the direction of the orthogonal projections of the long axes of the first liquid crystal molecules 150' on the plane where the third alignment film 151 is located is parallel to the direction of the orthogonal projections of the long axes of the second liquid crystal molecules 140' anchored by the first alignment film 141 and the second alignment film 142 on the plane where the third alignment film 151 is located, the in-plane retardation of the optical compensation layer 15 is in a range of 160 nm to 240 nm, and the in-plane retardation of the liquid crystal layer 14 is in a range of 350 nm±25 nm. For example, the in-plane retardation of the optical compensation layer 15 is any one of 160 nm, 180 nm, 200 nm, 220 nm and 240 nm.

In a case where the in-plane retardation of the optical compensation layer 15 is in a range of 160 nm to 240 nm, a forward compensation effect of the optical compensation layer 15 is good. The in-plane retardation of the optical compensation layer 15 in such a range is combined with an appropriate in-plane retardation of the liquid crystal layer 14, so that combinations of the optical compensation layer 15 and the liquid crystal layer 14 may be provided, and the liquid crystal display panel 1 is ultimately ensured to have a good display effect.

Under the condition that the optical compensation layer 15 plays a role of forward compensation, the requirement for in-plane retardation have been described above, and under the condition that the optical compensation layer 15 plays a role of reverse compensation, a requirement for in-plane retardation will be described as follows.

In some embodiments, in a case where the direction of the orthogonal projections of the long axes of the first liquid crystal molecules 150' on the plane where the third alignment film 151 is located is perpendicular to the direction of the orthogonal projections of the long axes of the second liquid crystal molecules 140' anchored by the first alignment film 141 and the second alignment film 142 on the plane where the third alignment film 151 is located, the optical compensation layer 15 plays a role of reverse compensation, and in this case, the in-plane retardation of the optical compensation layer 15 is equal to the in-plane retardation of the liquid crystal layer 14. In this structure, since the optical compensation layer 15 plays the role of reverse compensation, in a case where the in-plane retardation of the optical compensation layer 15 is equal to the in-plane retardation of the liquid crystal layer 14, the optical compensation layer 15 can completely cancel an influence of the liquid crystal layer 14 on the polarization state of light.

On this basis, in some embodiments, the in-plane retardation of the liquid crystal layer 14 is, for example, in a range of 580 nm to 620 nm.

On this basis, the in-plane retardation of the liquid crystal layer 14 is any one of 580 nm, 590 nm, 600 nm, 610 nm or 620 nm.

Since a wavelength of red light is in a range of 625 nm to 740 nm, and a wavelength of green light is in a range of 492 nm to 577 nm, the in-plane retardation of the liquid crystal layer 14 and the in-plane retardation of the optical compensation layer 15 are relatively close to the wavelengths of red light and green light, and further the liquid crystal layer 14 and the optical compensation layer 15 have a low transmittance relative to red light and green light. That is, by setting the in-plane retardation of the liquid crystal layer 14 and the optical compensation layer 15 to be in a range of 580 nm to 620 nm, the amount of transmission of red light and green light may be reduced. However, a wavelength of blue light is in a range of 440 nm to 475 nm that is quite different from the setting range of the in-plane retardation of the liquid crystal layer 14 and the optical compensation layer 15, so that a transmittance of blue light is relatively high. In this way, when the liquid crystal display panel 1 displays images in a dark state (in the L0 state), the color of the liquid crystal display panel 1 appears blue no matter whether the liquid crystal display panel 1 is viewed from the left side or the right side, which further prevents the problem of color cast from occurring in the liquid crystal display panel 1.

For example, the in-plane retardation of the liquid crystal layer 14 is any one of 580 nm, 590 nm, 600 nm, 610 nm or 620 nm. In a case where the in-plane retardation of the liquid crystal layer 14 is 600 nm, this value is relatively close to the wavelength of red light or the wavelength of green light.

Of course, the optical compensation layer 15 may also be a +B compensation layer or any other compensation layer that plays the same role as the optical compensation layer 15 in the present application.

In some embodiments, referring to FIG. 1F, the third alignment film 151 is disposed on a side of the first base substrate 11 proximate to the liquid crystal layer 14.

In some embodiments, referring to FIGS. 1D and 1E, the third alignment film 151 is disposed on a side of the first base substrate 11 away from the liquid crystal layer 14.

In some other embodiments, referring to FIGS. 1A and 1B, the third alignment film 151 is disposed on a side of the second base substrate 12 proximate to the liquid crystal layer 14.

In some embodiments, as shown in FIG. 1C, the third alignment film 151 is disposed on a side of the second base substrate 12 away from the liquid crystal layer 14.

Based on the above, referring to FIGS. 1A to 1G, the alignment direction of the third alignment film 151 is the same as the alignment directions of the first alignment film 141 and the second alignment film 142.

In some other embodiments, referring to FIGS. 1H and 1I, the third alignment film 151 is disposed on a side of the second base substrate 12 proximate to the liquid crystal layer 14.

The alignment direction of the third alignment film 151 is perpendicular to the alignment directions of the first alignment film 141 and the second alignment film 142.

The first liquid crystal molecules 150' in the optical compensation layer 15 are cured in the optical compensation layer 15, and positions and pretilt angles of the first liquid crystal molecules 150' are fixed and are not affected by an electric field in the liquid crystal display panel 1. Therefore, a position of the optical compensation layer 15 may be changed according to different design requirements and process requirements, thereby improving adaptability of the optical compensation layer 15 to different liquid crystal display panels 1.

Figure 6A:
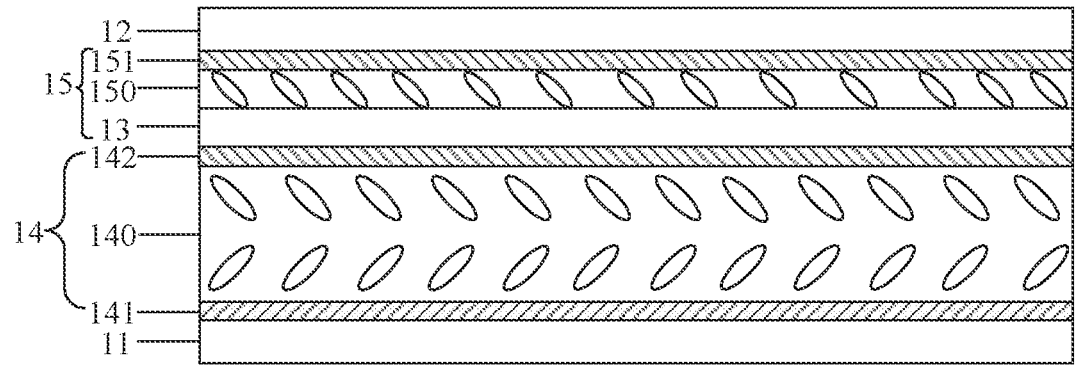
FIGS. 6A to 6G are schematic diagrams showing structures of yet other liquid crystal display panels, in accordance with the embodiments of the present disclosure.
Figure 6B:
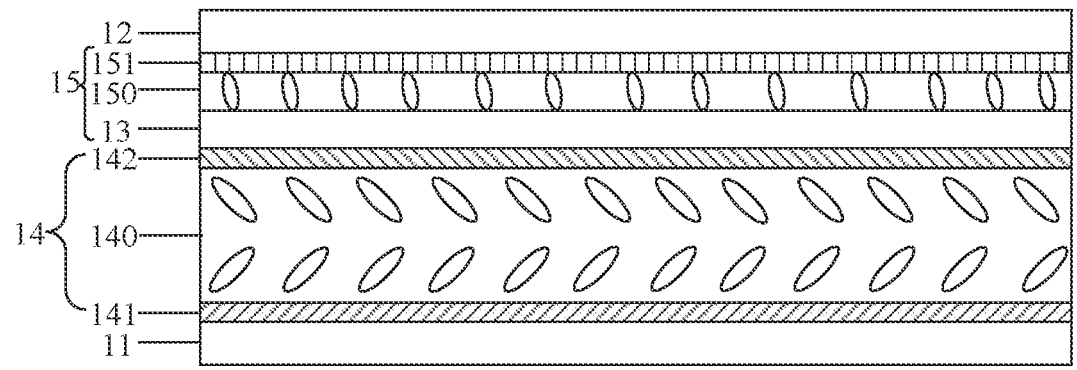
Figure 6C:
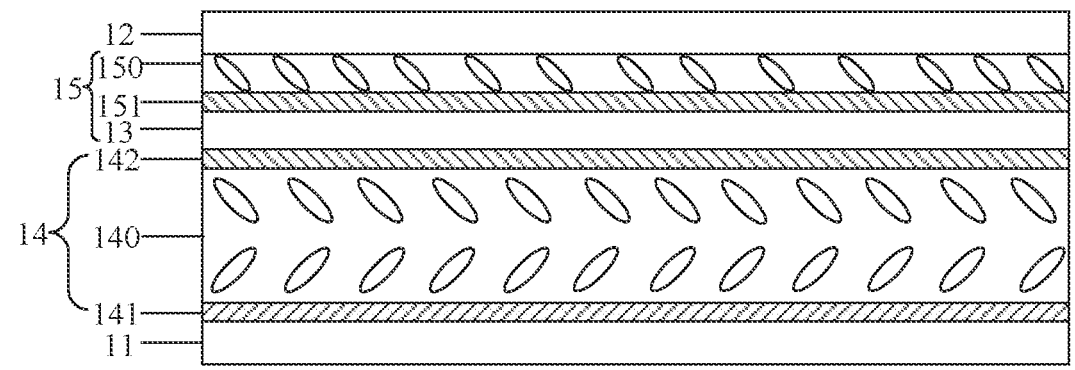

In some embodiments, referring to FIGS. 6A to 6C, the optical compensation layer 15 further includes a third base substrate 13, and the third base substrate 13 and the third alignment film 151 are located on the same side or opposite sides of the first liquid crystal molecular layer 150.

In some embodiments, the third base substrate 13 is made of the same material as the first base substrate 11 and the second base substrate 12.

In some other embodiments, a thickness of the third base substrate 13 is less than or equal to a thickness of the first base substrate 11 and/or a thickness of the second base substrate 12.

Referring to FIGS. 6A and 6B, the third base substrate 13 and the third alignment film 151 are located on both sides of the first liquid crystal molecular layer 150.

In FIG. 6A, the alignment direction of the third alignment film 151 is the same as the alignment directions of the first alignment film 141 and the second alignment film 142. In FIG. 6B, the alignment direction of the third alignment film 151 is perpendicular to the alignment directions of the first alignment film 141 and the second alignment film 142.

Referring to FIG. 6C, the third alignment film 151 is located on the third base substrate 13, that is, the third alignment film 151 and the third base substrate 13 are located on the same side of the first liquid crystal molecular layer 150, and the alignment direction of the third alignment film 151 is the same as the alignment directions of the first alignment film 141 and the second alignment film 142.

In some other embodiments, the third alignment film 151 is located on the third base substrate 13, that is, the third alignment film 151 and the third base substrate 13 are located on the same side of the first liquid crystal molecular layer 150, and the alignment direction of the third alignment film 151 is perpendicular to the alignment directions of the first alignment film 141 and the second alignment film 142.

After the third base substrate 13 is provided in the liquid crystal display panel 1, in a case where the third alignment film 151 and the third base substrate 13 are located on opposite sides of the first liquid crystal molecular layer 150, the third base substrate 13 has a planarization function, which facilitates subsequent fabrication of other film layers such as the second alignment film 142 on a side of the third base substrate 13 away from the first liquid crystal molecular layer 150. In a case where the third alignment film 151 and the third base substrate 13 are located on the same side of the first liquid crystal molecular layer 150, the third alignment film 151 may be directly fabricated on the third base substrate 13, then the third base substrate 13 and the second base substrate 12 are assembled to form a cell, and the first liquid crystal molecules 150' are injected thereinto to form the first liquid crystal molecular layer 150, so that the third alignment film 151 may be fabricated independently, and process conditions (e.g., high temperature) in a process of fabricating the third alignment film 151 will not affect other film layers, such as a thin film transistor layer, which has been fabricated on the first base substrate 11 or the second base substrate 12.

In some other embodiments, referring to FIG. 6C, the third alignment film 151 and the second alignment film 142 are disposed on opposite sides of the third base substrate 13. For example, in a thickness direction of the third base substrate 13, the opposite sides of the third base substrate 13 are an upper surface and a lower surface of the third base substrate 13.

In a case where the third alignment film 151 and the second alignment film 142 are disposed on the opposite sides of the third base substrate 13, it is convenient to directly fabricate the third alignment film 151 and the second alignment film 142 on the third base substrate 13, so that fabrication processes of the third alignment film 151 and the second alignment film 142 are more independent than fabrication processes of other structures (e.g., structures formed on the first base substrate 11 and the second base substrate 12) in the liquid crystal display panel 1. Other film layers need to be fabricated on the first base substrate 11 and the second base substrate 12, for example, the thin film transistor layer needs to be fabricated on the first base substrate 11, and a filter layer needs to be fabricated on the second base substrate 12. Therefore, when fabrication processes of the third alignment film 151 and the second alignment film 142 are independent relative to other structures in the liquid crystal display panel 1, a manufacturing efficiency of the liquid crystal display panel 1 may be improved, and an influence on the other structures when the third alignment film 151 and the second alignment film 142 are fabricated may be avoided.

In some embodiments, referring to FIGS. 6D to 6G, the optical compensation layer 15 further includes a fourth alignment film 152, and the fourth alignment film 152 is disposed on a side of the third base substrate 13 away from the liquid crystal layer 14, or on a side of the second base substrate 12 proximate to the liquid crystal layer 14. The fourth alignment film 152 is configured to anchor a part, proximate to the fourth alignment film 152, of first liquid crystal molecules 150' in the first liquid crystal molecular layer 150, so that the part of first liquid crystal molecules 150' proximate to the fourth alignment film 152 have a fourth pretilt angle θ. An alignment direction of the fourth alignment film 152 is the same as the alignment direction of the third alignment film 151, and a direction of the fourth pretilt angle θ is opposite to or the same as the direction of the third pretilt angle γ.

Figure 6D:
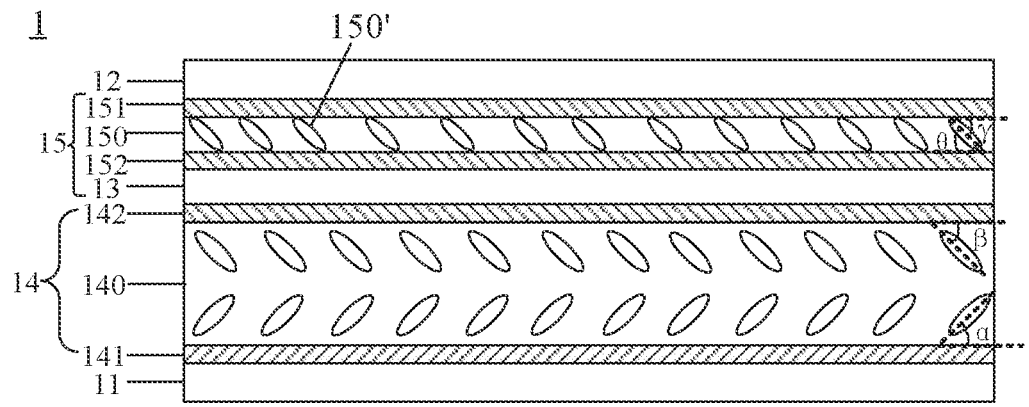

Referring to FIG. 6D, the fourth alignment film 152 is disposed on a side of the third base substrate 13 away from the liquid crystal layer 14, and the third alignment film 151 is disposed on a side of the second base substrate 12 proximate to the liquid crystal layer 14. That is, the third alignment film 151 and the fourth alignment film 152 are arranged opposite to each other.

Figure 6E:
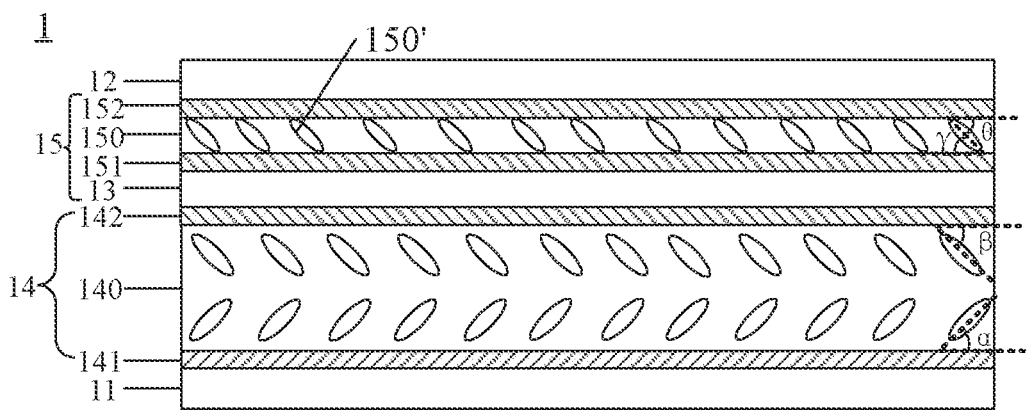
Figure 6F:
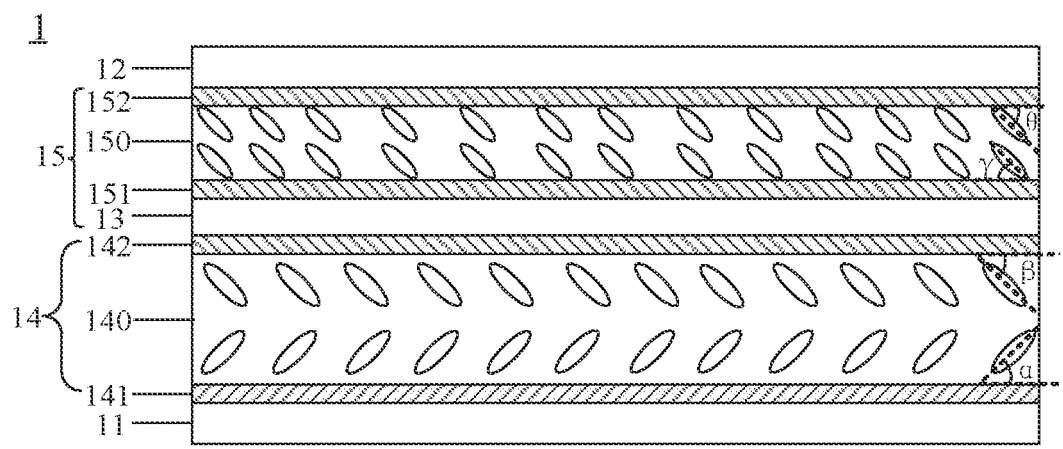
Figure 6G:
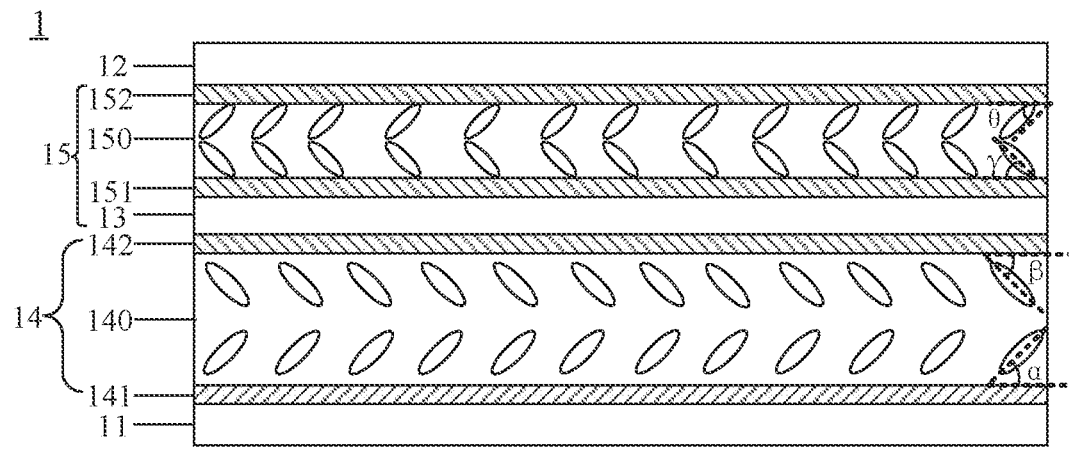

In some embodiments, referring to FIGS. 6E to 6G, the third alignment film 151 is disposed on a side of the third base substrate 13 away from the liquid crystal layer 14, and the fourth alignment film 152 is disposed on a side of the second base substrate 12 proximate to the liquid crystal layer 14.

The alignment direction of the fourth alignment film 152 is the same as the alignment direction of the third alignment film 151. The alignment direction of the third alignment film 151 may be the same as the alignment directions of the first alignment film 141 and the second alignment film 142, and in this case, the alignment direction of the third alignment film 151 is the first direction; or the alignment direction of the third alignment film 151 may also be perpendicular to the alignment directions of the first alignment film 141 and the second alignment film 142, and in this case, the alignment direction of the third alignment film 151 is the second direction. Therefore, the alignment direction of the fourth alignment film 152 includes the first direction or the second direction. FIGS. 6E and 6F are illustrated by taking an example in which the alignment direction of the third alignment film 151 is the same as the alignment directions of the first alignment film 141 and the second alignment film 142.

In some embodiments, referring to FIGS. 6D and 6E, in a case where the first liquid crystal molecules 150' in the first liquid crystal molecular layer 150 are of a one-layer structure, the third alignment film 151 and the fourth alignment film 152 anchor the layer of first liquid crystal molecules 150' simultaneously, and the fourth pretilt angle θ has the same magnitude and the same direction as the third pretilt angle γ. In this structure, the fourth alignment film 152 may increase an anchoring force to the first liquid crystal molecules 150', and further fixes the positions of the first liquid crystal molecules 150'.

In some other embodiments, referring to FIGS. 6F and 6G, in a case where the first liquid crystal molecules 150' in the first liquid crystal molecular layer 150 are of a multi-layer (at least two-layer) structure, the third alignment film 151 may anchor a part of first liquid crystal molecules 150' proximate thereto, the fourth alignment film 152 may anchor a part of first liquid crystal molecules 150' proximate thereto, the magnitude of the fourth pretilt angle θ is equal to or approximately equal to the magnitude of the third pretilt angle γ. In a case where the direction of the fourth pretilt angle θ is the same as the direction of the third pretilt angle γ, arrangement directions of the first liquid crystal molecules 150' in the whole first liquid crystal molecular layer 150 are the same or approximately the same. Referring to FIG. 6G, in a case where the direction of the fourth pretilt angle θ is opposite to the direction of the third pretilt angle γ, when the liquid crystal display panel 1 is viewed from different viewing angles, phase differences of light passing through first liquid crystal molecules 150' at different positions in the first liquid crystal molecular layer 150 may be equal or approximately equal, and polarization states thereof are the same, thereby further enhancing the capability of the liquid crystal display panel 1 to improve the color cast. Since the fourth alignment film 152 is used in combination with the third alignment film 151, the first liquid crystal molecules 150' may be of the multi-layer structure, which increases selectable types of liquid crystal molecules that may be used as the first liquid crystal molecules 150', and further may reduce the production cost of the liquid crystal display panel 1 to a certain extent.

In some embodiments, referring to FIG. 6D, the fourth alignment film 152 and the second alignment film 142 are disposed on opposite sides of the third base substrate 13.

The fourth alignment film 152 and the second alignment film 142 are fabricated on the third base substrate 13, and the fabrication process is relatively simple.

Figure 7:
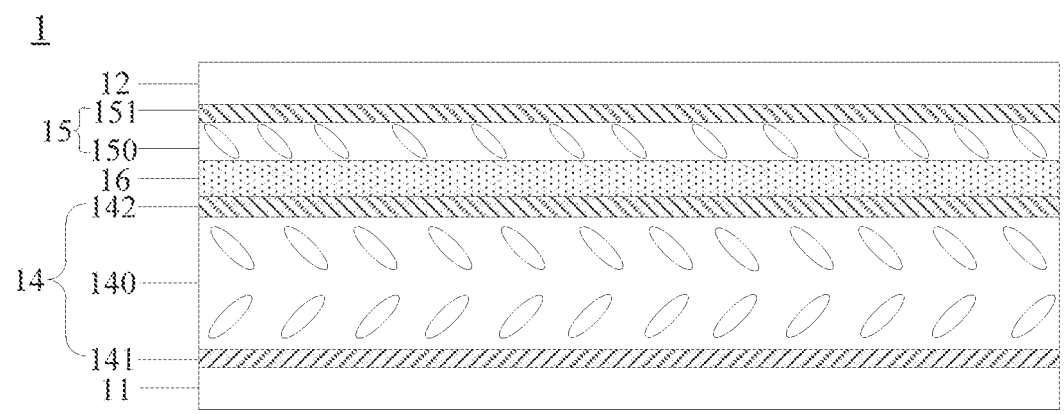
FIG. 7 is a schematic diagram showing a structure of yet another liquid crystal display panel, in accordance with the embodiments of the present disclosure.

In some embodiments, referring to FIG. 7, the third alignment film 151 is disposed on a side of the second base substrate 12 proximate to the liquid crystal layer 14, a planarization layer 16 is further provided on a side of the first liquid crystal molecular layer 150 proximate to the liquid crystal layer 14, and the second alignment film 142 is disposed on a side of the planarization layer 16 proximate to the liquid crystal layer 14.

The planarization layer 16 is also referred to as an over coat (OC) layer, the planarization layer 16 may be made of an organic material, such as polyimide. The planarization layer 16 mainly plays a role of planarization. After the planarization layer 16 is provided on the side of the first liquid crystal molecular layer 150 away from the second base substrate 12, a relatively flat surface may be provided for subsequent fabrication of the second alignment film 142, so as to improve a quality of the fabricated second alignment film 142.

In some embodiments, thicknesses of the first alignment film 141, the second alignment film 142, the third alignment film 151 and the fourth alignment film 152 are, for example, in a range of 0.01 μm to 10 μm.

The thicknesses of the alignment films (including the first alignment film 141 to the fourth alignment film 152) within the above thickness range are small, which is beneficial to achieving lightness and thinness of the liquid crystal display panel 1.

In some other embodiments, as shown in FIGS. 6D to 6G, the first pretilt angle α, the second pretilt angle β, the third pretilt angle γ and the fourth pretilt angle θ are equal in magnitude.

In some embodiments, the first pretilt angle α, the second pretilt angle β, the third pretilt angle γ and the fourth pretilt angle θ are in a range of 2°±28.

For example, the first pretilt angle α, the second pretilt angle β, the third pretilt angle γ and the fourth pretilt angle θ are all equal to 2°.

For another example, the first pretilt angle α, the second pretilt angle β, the third pretilt angle γ and the fourth pretilt angle θ are all equal to 4°.

It will be noted that, there is no case where the first pretilt angle α, the second pretilt angle β, the third pretilt angle γ and the fourth pretilt angle θ are equal to 0°. In addition, the above description of directions of the pretilt angles (the first pretilt angle α to the fourth pretilt angle θ) is based on relative positions of the pretilt angles in the liquid crystal display panel 1.

Specific values of the first pretilt angle α, the second pretilt angle β, the third pretilt angle γ and the fourth pretilt angle θ may be selected according to actual needs and process conditions, so as to reduce the difficulty of manufacturing the liquid crystal display panel 1.

In some embodiments, the first base substrate 11 is, for example, a base in the array substrate, and the second base substrate 12 is, for example, a base in the color filter substrate.

It will be noted that the states of the liquid crystal display panel 1 shown in FIGS. 6A to 6G and FIG. 7 are states of the liquid crystal display panel 1 when no voltage is applied thereto.

Based on this, in some embodiments, referring to FIGS. 8A to 9B, a functional film layer 17 is further provided on the first base substrate 11. The functional film layer 17 and the optical compensation layer 15 are disposed on opposite sides of the liquid crystal layer 14, or the functional film layer 17 and the liquid crystal layer 14 are disposed on opposite sides of the optical compensation layer 15. The functional film layer 17 includes, for example, a thin film transistor layer, a pixel electrode layer, a common electrode layer, data lines, insulating layers and the like, and a specific position and a specific structure of each film layer in the functional film layer 17 are determined according to different design requirements, and are not limited in the present disclosure. Positions of the functional film layer 17, the liquid crystal layer 14 and the optical compensation layer 15 may be selected according to requirements under a condition that the liquid crystal display panel 1 may be ensured to work normally, so that a position arrangement of each film layer in the liquid crystal display panel 1 is more flexible.

Figure 8A:
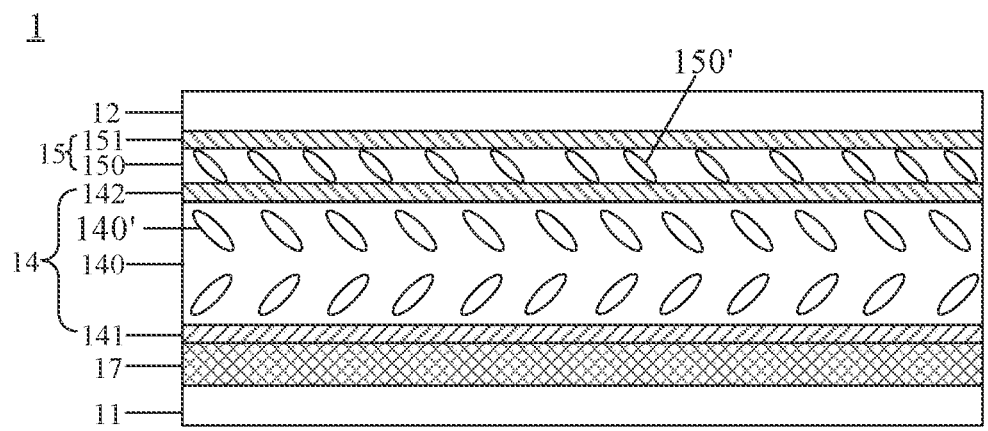
FIGS. 8A to 8B are schematic diagrams showing structures of yet other liquid crystal display panels, in accordance with the embodiments of the present disclosure.
Figure 8B:
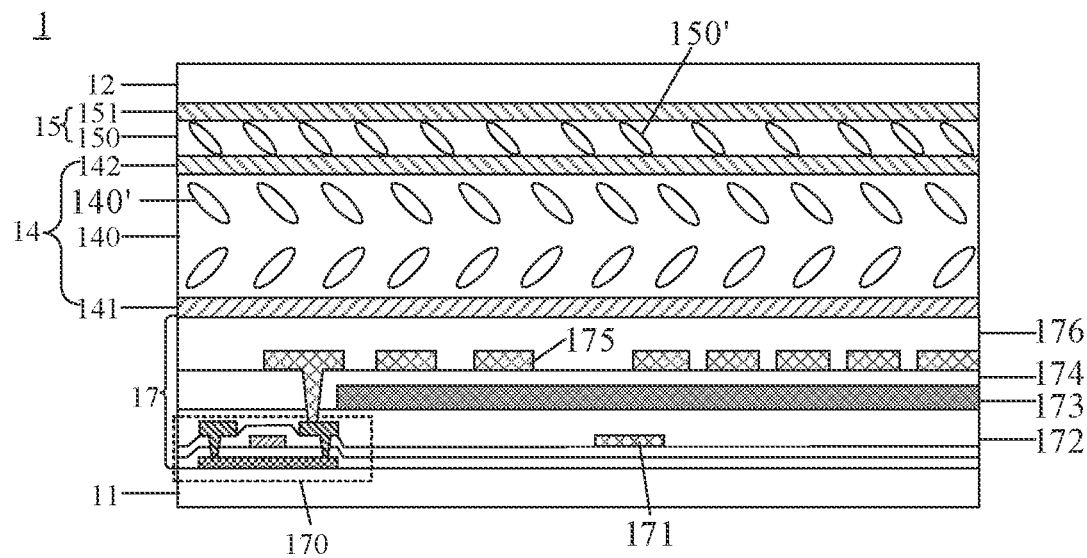

For example, referring to FIG. 8B, the thin film transistor layer 170 in the functional film layer 17 is disposed on a side of the first base substrate 11 proximate to the liquid crystal layer 14, and the thin film transistor layer 170 includes a plurality of thin film transistors. Sources and drains of the thin film transistors and data lines 171 are fabricated by using a same conductive material in the same layer. A first insulating layer 172, a common electrode layer 173, a second insulating layer 174, a pixel electrode layer 175 and a third insulating layer 176 that are all sequentially stacked are provided on a side of the data line 171 away from the first base substrate 11. The pixel electrode 175 includes a plurality of strip-shaped electrodes spaced apart from one another, the common electrode layer 173 includes a common electrode in a planar structure, and the pixel electrode and the common electrode are both transparent. Materials of the first insulating layer 172, the second insulating layer 174 and the third insulating layer 176 may be an inorganic material, such as at least one of silicon oxide and silicon nitride, or an organic material, such as polyimide, which is not limited in the present disclosure.

In the structure as shown in FIG. 8B, the pixel electrode layer 175 is closer to the liquid crystal layer 14 than the common electrode layer 173, and thus the pixel electrode is of a strip-shaped structure and the common electrode is of a planar structure. In some other embodiments, the common electrode layer 173 is closer to the liquid crystal layer 14 than the pixel electrode layer 175, and thus the common electrode is of a strip-shaped structure and the pixel electrode is of a planar structure. In yet some other embodiments, the pixel electrode and the common electrode both are of a strip-shaped structure.

Figure 9A:
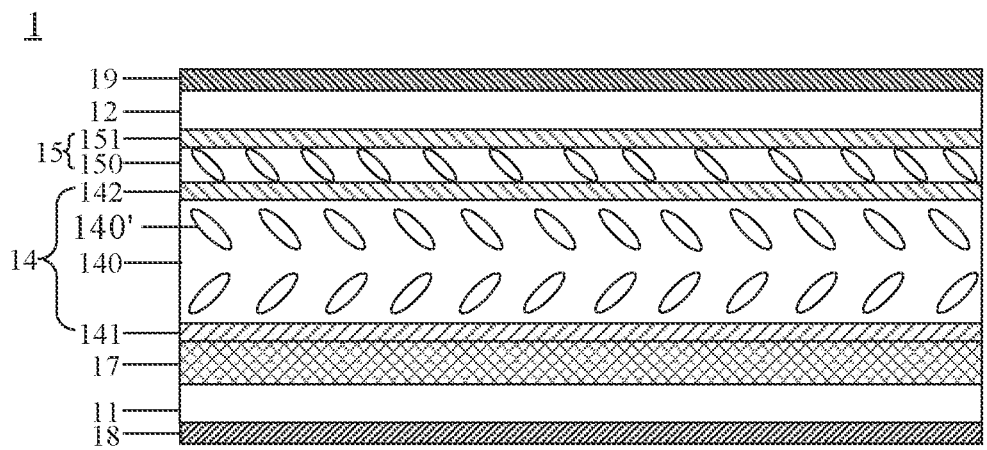
FIGS. 9A to 9B are schematic diagrams showing structures of yet other liquid crystal display panels, in accordance with the embodiments of the present disclosure.
Figure 9B:
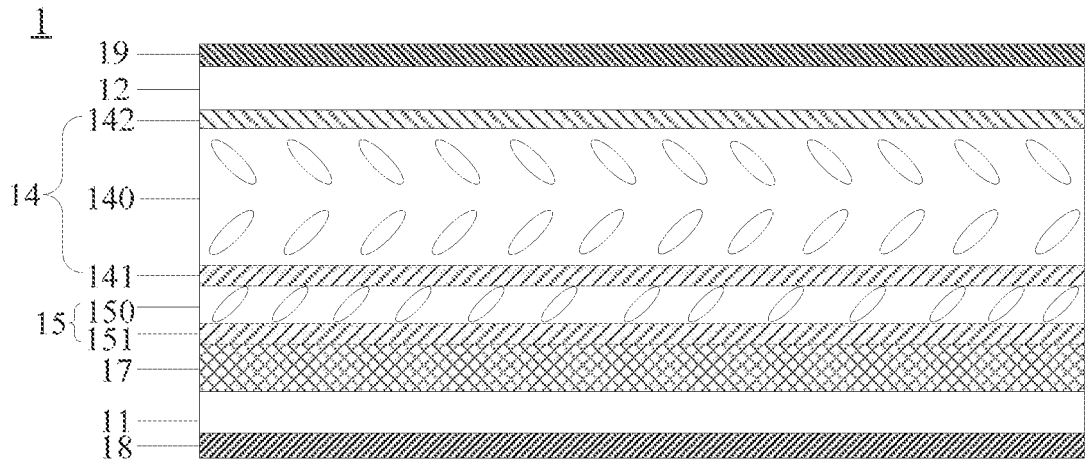

On this basis, referring to FIGS. 9A and 9B, the liquid crystal display panel 1 further includes the first polarizer 18 and the second polarizer 19, and a polarization direction of the first polarizer 18 and a polarization direction of the second polarizer 19 are perpendicular to or approximately perpendicular to each other.

For example, the first polarizer 18 is disposed on a side of the first base substrate 11 away from the liquid crystal layer 14, and the second polarizer 19 is disposed on a side of the second base substrate 12 away from the liquid crystal layer 14.

The first polarizer 18 and the second polarizer 19 are used for changing the polarization state of light, the first polarizer 18 is used to make light exiting from the backlight module become linearly polarized light, and the second polarizer 19 is used to make light having the same polarization direction as the second polarizer 19 exit. It can be understood by those skilled in the art that, when the liquid crystal display panel 1 is in the L0 state, a direction of the linearly polarized light entering the second polarizer 19 is perpendicular to the polarization direction of the second polarizer 19, and thus the linearly polarized light cannot exit from the second polarizer 19.

Figure 10:
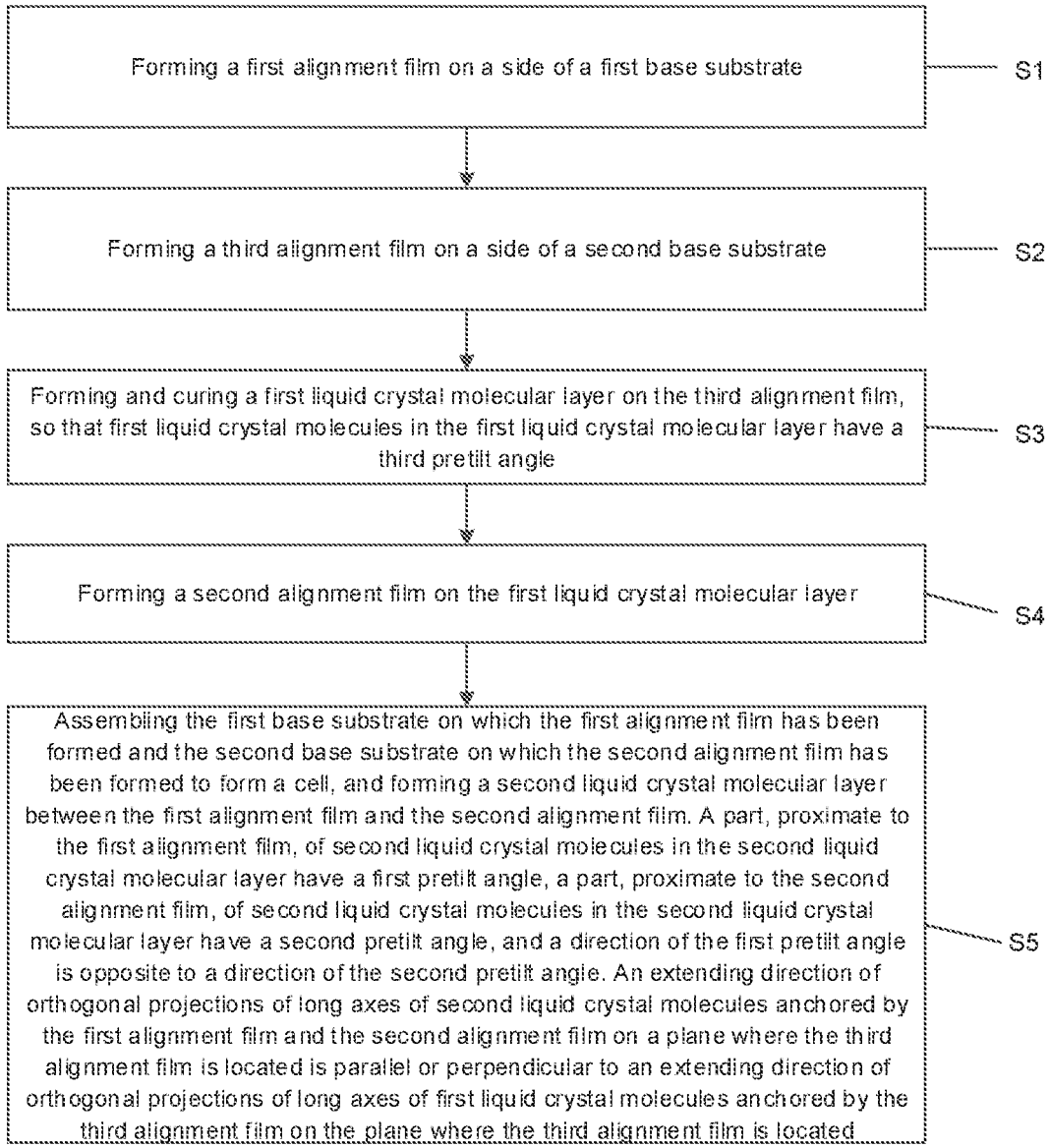
FIG. 10 is a flow diagram of a method of manufacturing a liquid crystal display panel, in accordance with the embodiments of the present disclosure.

Referring to FIG. 10, embodiments of the present disclosure further provide a method of manufacturing the liquid crystal display panel 1, and the method includes S1 to S5.

In S1, a first alignment film 141 is formed on a side of a first base substrate 11.

A material of the first alignment film 141 is, for example, polyimide, which is coated on the first base substrate 11, for example, by a coating method, and then an alignment rubbing process of the first alignment film 141 is performed, and through the alignment rubbing process, an alignment direction of the first alignment film 141 and a magnitude and a direction of a first pretilt angle α may be determined.

In S2, a third alignment film 151 is formed on a side of a second base substrate 12.

An alignment direction of the formed third alignment film 151 is the same as or perpendicular to the alignment direction of the first alignment film 141.

Referring to FIGS. 1A to 1G, the alignment direction of the third alignment film 151 is the same as the alignment direction of the first alignment film 141, that is, both are the first direction. Referring to FIGS. 1H to 1I, the alignment direction of the third alignment film 151 is perpendicular to the alignment direction of the first alignment film 141, that is, the alignment direction of the third alignment film 151 is the second direction.

In S3, a first liquid crystal molecular layer 150 is formed on the third alignment film 151 and is cured, so that first liquid crystal molecules 150' in the first liquid crystal molecular layer 150 have a third pretilt angle γ.

Curing of the first liquid crystal molecular layer 150 is achieved, for example, by adding a polymer, such as a photopolymer or a thermal polymer, to the first liquid crystal molecules 150' and then curing the polymer by ultraviolet light, heating, etc.

In S4, a second alignment film 142 is formed on the first liquid crystal molecular layer 150.

An alignment direction of the formed second alignment film 142 is the same as the alignment direction of the first alignment film 141.

For example, referring to FIGS. 1A to 1I, alignment directions of the first alignment film 141 and the second alignment film 142 are both the first direction. In S5, the first base substrate 11 on which the first alignment film 141 has been formed and the second base substrate 12 on which the second alignment film 142 has been formed are assembled to form a cell, and a second liquid crystal molecular layer 140 is formed between the first alignment film 141 and the second alignment film 142. A part, proximate to the first alignment film 141, of second liquid crystal molecules 140' in the second liquid crystal molecular layer 140 have a first pretilt angle α, a part, proximate to the second alignment film 142, of second liquid crystal molecules 140' in the second liquid crystal molecular layer 140 have a second pretilt angle β, and a direction of the first pretilt angle α is opposite to a direction of the second pretilt angle β. An extending direction of orthogonal projections of long axes of second liquid crystal molecules 140' anchored by the first alignment film 141 and the second alignment film 142 on a plane where the third alignment film 151 is located is parallel or perpendicular to an extending direction of orthogonal projections of long axes of first liquid crystal molecules 150' anchored by the third alignment film 151 on the plane where the third alignment film 151 is located.

In a case where the alignment direction of the third alignment film 151 is the same as the alignment directions of the first alignment film 141 and the second alignment film 142, the direction of the orthogonal projections of the long axes of the second liquid crystal molecules 140' anchored by the first alignment film 141 and the second alignment film 142 on the plane where the third alignment film 151 is located is parallel to the direction of the orthogonal projections of the long axes of the first liquid crystal molecules 150' anchored by the third alignment film 151 on the plane where the third alignment film 151 is located. In a case where the alignment direction of the third alignment film 151 is perpendicular to the alignment directions of the first alignment film 141 and the second alignment film 142, the direction of the orthogonal projections of the long axes of the second liquid crystal molecules 140' anchored by the first alignment film 141 and the second alignment film 142 on the plane where the third alignment film 151 is located is perpendicular to the direction of the orthogonal projections of the long axes of the first liquid crystal molecules 150' anchored by the third alignment film 151 on the plane where the third alignment film 151 is located.

Referring to FIGS. 1A to 1I, although the alignment directions of the first alignment film 141 and the second alignment film 142 are both the first direction, the direction of the first pretilt angle α is opposite to the direction of the second pretilt angle β. In a case where the alignment direction of the third alignment film 151 is the same as the alignment directions of the first alignment film 141 and the second alignment film 142, a direction of the third pretilt angle γ is the same as the direction of the first pretilt angle α or the direction of the second pretilt angle β. In a case where the alignment direction of the third alignment film 151 is perpendicular to the alignment directions of the first alignment film 141 and the second alignment film 142, the direction of the third pretilt angle γ is perpendicular to the direction of the first pretilt angle α and the direction of the second pretilt angle β.

The first liquid crystal molecules 150' and the second liquid crystal molecules 140' may be the same liquid crystal molecules or different liquid crystal molecules, as long as they meet design requirements of the liquid crystal display panel 1, which is not limited in the present disclosure.

The method of manufacturing the liquid crystal display panel 1 has the same beneficial effects as the liquid crystal display panel 1 described above, and thus details will not be repeated herein.

In some embodiments, referring to FIG. 7, before the second alignment film 142 is formed on the first liquid crystal molecular layer 150, the method of manufacturing the liquid crystal display panel 1 further includes:
forming a planarization layer 16 on the first liquid crystal molecular layer 150. The planarization layer 16 may make a surface of the first liquid crystal molecular layer 150 proximate to the liquid crystal layer 14 smoother, which facilitates subsequent fabrication of the second alignment film 142 on the planarization layer 16.

The foregoing descriptions are merely some specific implementation manners of the present disclosure, but the protection scope of the present disclosure is not limited thereto, and changes or replacements that any person skilled in the art could conceive of within the technical scope disclosed by the present disclosure shall be within the protection scope of the present disclosure. Therefore, the protection scope of the present disclosure shall be subject to the protection scope of the claims.

What is claimed is:

1. A liquid crystal display panel, comprising:
a first base substrate and a second base substrate that are arranged opposite to each other;
a liquid crystal layer disposed between the first base substrate and the second base substrate, the liquid crystal layer including a first alignment film and a second alignment film that are arranged opposite to each other, and a second liquid crystal molecular layer located between the first alignment film and the second alignment film;
the first alignment film being configured to anchor a part, proximate to the first alignment film, of second liquid crystal molecules in the second liquid crystal molecular layer;
the part of second liquid crystal molecules proximate to the first alignment film having a first pretilt angle;
the second alignment film being configured to anchor a part, proximate to the second alignment film, of the second liquid crystal molecules in the second liquid crystal molecular layer; and
the part of second liquid crystal molecules proximate to the second alignment film having a second pretilt angle; and
an optical compensation layer disposed on a side of the first alignment film or the second alignment film away from the second liquid crystal molecular layer, the optical compensation layer including a third alignment film and a first liquid crystal molecular layer;
the third alignment film being configured to anchor first liquid crystal molecules, proximate to the third alignment film, in the first liquid crystal molecular layer; and
the first liquid crystal molecules proximate to the third alignment film having a third pretilt angle, wherein an extending direction of orthogonal projections of long axes of the first liquid crystal molecules on a plane where the third alignment film is located is parallel to an extending direction of orthogonal projections of long axes of second liquid crystal molecules anchored by the first alignment film and the second alignment film on the plane where the third alignment film is located; and
an alignment direction of the first alignment film, an alignment direction of the second alignment film and an alignment direction of the third alignment film are the same,
wherein the optical compensation layer is disposed on the side of the first alignment film away from the second liquid crystal molecular layer;
the third alignment film is disposed on a side of the first base substrate proximate to the liquid crystal layer;
the first liquid crystal molecular layer is disposed on a side of the third alignment film proximate to the second liquid crystal molecular layer, and the first liquid crystal molecular layer is disposed directly on the first alignment film;
a direction of the first pretilt angle is opposite to a direction of the second pretilt angle; and
a direction of the third pretilt angle is the same as the direction of the first pretilt angle; or
wherein the optical compensation layer is disposed on the side of the second alignment film away from the second liquid crystal molecular layer;
the third alignment film is disposed on a side of the second base substrate proximate to the liquid crystal layer;
the first liquid crystal molecular layer is disposed on a side of the third alignment film proximate to the second liquid crystal molecular layer, and the first liquid crystal molecular layer is disposed directly on the second alignment film;
a direction of the first pretilt angle is opposite to a direction of the second pretilt angle; and
a direction of the third pretilt angle is the same as the direction of the second pretilt angle.

2. The liquid crystal display panel according to claim 1, wherein a sum of an in-plane retardation of the optical compensation layer and an in-plane retardation of the liquid crystal layer is equal to a positive integer multiple of a first wavelength; and the first wavelength is in a range of 535 nm±50 nm.

3. The liquid crystal display panel according to claim 2, wherein the in-plane retardation of the optical compensation layer is in a range of 185 nm±25 nm, and the in-plane retardation of the liquid crystal layer is in a range of 350 nm±25 nm.

4. The liquid crystal display panel according to claim 2, wherein the in-plane retardation of the optical compensation layer is in a range of 160 nm to 240 nm, and the in-plane retardation of the liquid crystal layer is in a range of 350 nm±25 nm.

5. The liquid crystal display panel according to claim 1, wherein the optical compensation layer further includes a third base substrate, and the third base substrate and the third alignment film are located opposite sides of the first liquid crystal molecular layer.

6. The liquid crystal display panel according to claim 5, wherein the third alignment film and the second alignment film are disposed on opposite sides of the third base substrate.

7. The liquid crystal display panel according to claim 5, wherein the optical compensation layer further includes a fourth alignment film disposed on a side of the third base substrate away from the liquid crystal layer or on a side of the second base substrate proximate to the liquid crystal layer;

the fourth alignment film is configured to anchor a part, proximate to the fourth alignment film, of first liquid crystal molecules in the first liquid crystal molecular layer;

the part of first liquid crystal molecules proximate to the fourth alignment film have a fourth pretilt angle; and a direction of the fourth pretilt angle is the same as the direction of the third pretilt angle.

8. The liquid crystal display panel according to claim 7, wherein the fourth alignment film and the second alignment film are disposed on opposite sides of the third base substrate.

9. The liquid crystal display panel according to claim 1, further comprising a planarization layer, wherein the third alignment film is disposed on a side of the second base substrate proximate to the liquid crystal layer, the planarization layer is disposed on a side of the first liquid crystal molecular layer proximate to the liquid crystal layer, and the second alignment film is disposed on a side of the planarization layer proximate to the liquid crystal layer.

10. The liquid crystal display panel according to claim 1, wherein the optical compensation layer is a +A compensation layer; or the second liquid crystal molecules are negative liquid crystal molecules, or the optical compensation layer is a +A compensation layer, and the second liquid crystal molecules are negative liquid crystal molecules.

11. The liquid crystal display panel according to claim 1, wherein the first pretilt angle, the second pretilt angle and the third pretilt angle are equal in magnitude.

12. The liquid crystal display panel according to claim 1, wherein the first pretilt angle, the second pretilt angle and the third pretilt angle are in a range of 2°±2°; or the first pretilt angle, the second pretilt angle and the third pretilt angle are in a range of 2°±1°.

13. The liquid crystal display panel according to claim 1, further comprising a functional film layer, wherein the functional film layer is disposed on the first base substrate;

the functional film layer and the optical compensation layer are disposed on opposite sides of the liquid crystal layer, or the functional film layer and the liquid crystal layer are disposed on opposite sides of the optical compensation layer.

14. A display device, comprising the liquid crystal display panel according to claim 1.

15. A method of manufacturing a liquid crystal display panel, comprising:

forming a first alignment film on a side of a first base substrate;

forming a third alignment film on a side of a second base substrate;

forming and curing a first liquid crystal molecular layer directly on the third alignment film, so that the third alignment film anchors first liquid crystal molecules, proximate to the third alignment film, in the first liquid crystal molecular layer, the first liquid crystal molecules proximate to the third alignment film having a third pretilt angle;

forming a second alignment film directly on the first liquid crystal molecular layer, an alignment direction of the first alignment film, an alignment direction of the second alignment film and an alignment direction of the third alignment film are the same; and assembling the first base substrate on which the first alignment film has been formed and the second base substrate on which the second alignment film has been formed to form a cell, and forming a second liquid crystal molecular layer between the first alignment film and the second alignment film, so that the first alignment film anchors a part, proximate to the first alignment film, of second liquid crystal molecules in the second liquid crystal molecular layer, and the second alignment film anchors a part, proximate to the second alignment film, of the second liquid crystal molecules in the second liquid crystal molecular layer;

wherein the part of second liquid crystal molecules proximate to the first alignment film have a first pretilt angle;

the part of second liquid crystal molecules proximate to the second alignment film have a second pretilt angle;

a direction of the first pretilt angle is opposite to a direction of the second pretilt angle; and a direction of the third pretilt angle is the same as the direction of the second pretilt angle;

an extending direction of orthogonal projections of long axes of second liquid crystal molecules anchored by the first alignment film and the second alignment film on a plane where the third alignment film is located is parallel to an extending direction of orthogonal projections of long axes of first liquid crystal molecules anchored by the third alignment film on the plane where the third alignment film is located;

wherein the first alignment film, the second alignment film and the third alignment film are formed through an alignment rubbing process, and rubbing directions of the first alignment film, the second alignment film and the third alignment film are the same.

16. The method according to claim 15, wherein before the second alignment film is formed on the first liquid crystal molecular layer, the method further comprises forming a planarization layer on the first liquid crystal molecular layer.

* * * * *